US009802574B2

(12) United States Patent
Jakobsson

(10) Patent No.: US 9,802,574 B2
(45) Date of Patent: Oct. 31, 2017

(54) RELAY ATTACK INHIBITING

(71) Applicant: QUALCOMM Incorporated, San Diego, CA (US)

(72) Inventor: Bjorn Markus Jakobsson, Portola Valley, CA (US)

(73) Assignee: QUALCOMM Incorporated, San Diego, CA (US)

(*) Notice: Subject to any disclaimer, the term of this patent is extended or adjusted under 35 U.S.C. 154(b) by 330 days.

(21) Appl. No.: 14/488,254

(22) Filed: Sep. 16, 2014

(65) Prior Publication Data

US 2016/0075307 A1 Mar. 17, 2016

(51) Int. Cl.
*B60R 25/24* (2013.01)
*B60R 25/20* (2013.01)
*B60R 25/31* (2013.01)
*G07C 9/00* (2006.01)

(52) U.S. Cl.
CPC .......... *B60R 25/241* (2013.01); *B60R 25/209* (2013.01); *B60R 25/24* (2013.01); *B60R 25/31* (2013.01); *G07C 9/00309* (2013.01)

(58) Field of Classification Search
CPC ..... B60R 25/241; B60R 25/209; B60R 25/31; G07C 9/00309
See application file for complete search history.

(56) References Cited

U.S. PATENT DOCUMENTS 5,710,548 A * 1/1998 LeMense .............. G01S 3/28
340/12.22
5,723,911 A * 3/1998 Glehr .................. B60R 25/24
180/287
6,726,636 B2 4/2004 Der et al.
(Continued)

FOREIGN PATENT DOCUMENTS

DE 102011013605 A1 9/2012
DE 102013217010 A1 3/2014
(Continued)

OTHER PUBLICATIONS

International Search Report and Written Opinion—PCT/US2015/047358—ISA/EPO—dated Nov. 10, 2015, 13 pgs.
(Continued)

*Primary Examiner* — Thomas G Black
*Assistant Examiner* — Peter D Nolan
(74) *Attorney, Agent, or Firm* — Hunter Clark PLLC

(57) ABSTRACT

An apparatus in a wireless vehicle-access system, that includes a vehicle and a fob, includes: a vehicle-authorization parameter module configured to obtain a value of a vehicle-authorization parameter wherein the vehicle-authorization parameter comprises at least one of movement of the fob, a received directional signal, or a received audible signal; and a vehicle function compatibility module configured to: determine whether the value of the vehicle-authorization parameter is consistent or inconsistent with a desired function of the vehicle; inhibit the desired function of the vehicle in response to the value of the vehicle-authorization parameter being determined to be inconsistent with the desired function of the vehicle; and permit the desired function of the vehicle in response to the value of the vehicle-authorization parameter being determined to be consistent with the desired function of the vehicle.

44 Claims, 7 Drawing Sheets

(56) References Cited

U.S. PATENT DOCUMENTS

| | | | | |
|---|---|---|---|---|
| 7,791,457 | B2* | 9/2010 | Ghabra | B60R 25/24 340/426.36 |
| 7,973,649 | B2* | 7/2011 | DeMille | B60R 25/10 307/10.2 |
| 8,527,140 | B2 | 9/2013 | Schwartz et al. | |
| 8,638,202 | B2 | 1/2014 | Oesterling | |
| 8,698,605 | B2* | 4/2014 | Kim | H04L 9/3271 340/10.1 |
| 8,930,045 | B2* | 1/2015 | Oman | G01S 13/765 340/426.36 |
| 9,102,296 | B2* | 8/2015 | Seiberts | B60R 25/2072 |
| 9,210,188 | B2* | 12/2015 | Choi | H04W 4/008 |
| 2006/0244574 | A1* | 11/2006 | New | B60R 25/33 340/426.22 |
| 2009/0309713 | A1 | 12/2009 | Baruco et al. | |
| 2010/0265035 | A1* | 10/2010 | Ziller | G07C 9/00309 340/5.72 |
| 2010/0277296 | A1* | 11/2010 | DeMille | B60R 25/10 340/426.1 |
| 2014/0067161 | A1* | 3/2014 | Conner | B60R 25/20 701/2 |
| 2014/0091903 | A1 | 4/2014 | Birkel et al. | |
| 2014/0253287 | A1* | 9/2014 | Bauman | G07C 9/00309 340/5.61 |
| 2014/0285319 | A1* | 9/2014 | Khan | G07C 9/00309 340/5.61 |
| 2014/0330449 | A1* | 11/2014 | Oman | G01S 13/765 701/2 |
| 2014/0340193 | A1* | 11/2014 | Zivkovic | G07C 9/00111 340/5.61 |
| 2014/0375420 | A1* | 12/2014 | Seiberts | B60R 25/2072 340/5.31 |
| 2015/0074805 | A1* | 3/2015 | Choi | H04W 4/008 726/22 |
| 2015/0116078 | A1* | 4/2015 | Mishra | G07C 9/00007 340/5.51 |
| 2015/0116079 | A1* | 4/2015 | Mishra | G07C 9/00007 340/5.52 |
| 2015/0291127 | A1* | 10/2015 | Ghabra | G07C 9/00309 701/2 |
| 2015/0302673 | A1* | 10/2015 | Seiberts | B60R 25/2072 340/5.61 |
| 2016/0086401 | A1* | 3/2016 | Choi | H04W 4/008 340/5.61 |

FOREIGN PATENT DOCUMENTS

| | | |
|---|---|---|
| GB | 2511377 A | 9/2014 |
| WO | 2013157709 A1 | 10/2013 |

OTHER PUBLICATIONS

International Preliminary Report on Patentability—PCT/US2015/047358—The International Bureau of WIPO—Geneva, Switzerland—dated Mar. 30, 2017—8 pgs.

* cited by examiner

RELAY ATTACK INHIBITING

BACKGROUND

Keyless entry and ignition systems are common in vehicles, and while they are a desirable convenience feature, they also increase the exposure of theft, given their inherent vulnerability to so-called man-in-the-middle or relay attacks. In such an attack, two persons (P1 and P2), each equipped with a computational device with a radio transmitter, collaborate to gain access to one or more vehicle operations, e.g., entry into, starting, and/or driving to thus enable one of the persons, e.g., P1, to steal a vehicle. For a relay attack, P2 moves within radio distance of a fob carried by the vehicle owner. P2's computational device relays signals between the fob and P1's computational device. P1's device relays signals between the vehicle and P2's device. This allows P1 to enter and start the vehicle, which is then typically driven to a garage specializing in re-keying of stolen vehicles. After gaining access to and starting a vehicle, there may be no further authentication between vehicle and the fob until the vehicle is again started or unlocked. While a continuously ongoing authentication between the vehicle and the fob would complicate the effort of P2 (to stay near the fob while P1 drives the vehicle), it would still not prevent theft.

SUMMARY

An example of an apparatus in a wireless vehicle-access system, that includes a vehicle and a fob, includes: a vehicle-authorization parameter module configured to obtain a value of a vehicle-authorization parameter wherein the vehicle-authorization parameter comprises at least one of movement of the fob, a received directional signal, or a received audible signal; and a vehicle function compatibility module configured to: determine whether the value of the vehicle-authorization parameter is consistent or inconsistent with a desired function of the vehicle; inhibit the desired function of the vehicle in response to the value of the vehicle-authorization parameter being determined to be inconsistent with the desired function of the vehicle; and permit the desired function of the vehicle in response to the value of the vehicle-authorization parameter being determined to be consistent with the desired function of the vehicle.

Implementations of such an apparatus may include one or more of the following features. The vehicle-authorization parameter comprises movement of the fob, the desired function of the vehicle is vehicle starting, and the vehicle function compatibility module is configured to determine that the movement of the fob is consistent with the desired function if the movement of the fob is at least one of: a fob speed being below a vehicle-starting threshold; spatial fob motion being consistent with movement of a seat of the vehicle, the spatial fob motion comprising at least one of a direction or a magnitude of fob motion; or the spatial fob motion being consistent with a user of the fob sitting in the vehicle. The spatial fob motion being consistent with movement of the seat of the vehicle comprises the spatial fob motion differing from concurrent movement of at least a portion of the seat by less than a fob/seat-movement-differential threshold. The vehicle-authorization parameter comprises movement of the fob, the desired function of the vehicle is vehicle starting, and the vehicle function compatibility module is configured to determine that the movement of the fob is inconsistent with the desired function if the movement of the fob is spatial fob motion indicative of pedestrian motion. The vehicle-authorization parameter comprises movement of the fob, the desired function of the vehicle is vehicle driving, and the vehicle function compatibility module is configured to determine that the movement of the fob is consistent with the desired function if the movement of the fob is at least one of: spatial fob motion being consistent with a user of the fob sitting in the vehicle, the spatial fob motion comprising at least one of a direction or a magnitude of fob motion; a fob speed differing by less than a speed-differential threshold relative to a speed of the vehicle; or the spatial fob motion being consistent with movement of a seat of the vehicle. The spatial fob motion being consistent with movement of the seat of the vehicle comprises the spatial fob motion differing from concurrent movement of at least a portion of the seat by less than a fob/seat-movement-differential threshold. The vehicle-authorization parameter comprises movement of the fob, the desired function of the vehicle is vehicle driving, and the vehicle function compatibility module is configured to determine that the movement of the fob is inconsistent with the desired function if the movement of the fob is spatial fob motion indicative of pedestrian motion. The vehicle-authorization parameter comprises movement of the fob, the desired function of the vehicle is unlocking the vehicle, and the vehicle function compatibility module is configured to determine that the movement of the fob is consistent with the desired function if a fob speed is below a vehicle-unlocking threshold.

Also or alternatively, implementations of such an apparatus may include one or more of the following features. The vehicle-authorization parameter is the received directional signal, and the vehicle function compatibility module is configured to determine that the value of the vehicle-authorization parameter is consistent with the desired function if the value of the vehicle-authorization parameter is non-zero. The vehicle function compatibility module is configured to determine that the value of the vehicle-authorization parameter is consistent with the desired function if the value of the vehicle-authorization parameter exceeds a non-zero directional-signal-intensity threshold. The directional signal is received by the fob from the vehicle. The directional signal is received by the vehicle from the fob. The vehicle-authorization parameter is the received audible signal, and the vehicle function compatibility module is configured to determine that the value of the vehicle-authorization parameter is consistent with the desired function if the value of the vehicle-authorization parameter is non-zero. The vehicle function compatibility module is configured to determine that the value of the vehicle-authorization parameter is consistent with the desired function if the value of the vehicle-authorization parameter exceeds a non-zero audible-signal-intensity threshold.

An example of a method for a wireless vehicle-access system, that includes a vehicle and a fob, includes: obtaining, at the vehicle-access system, a value of a vehicle-authorization parameter wherein the vehicle-authorization parameter comprises at least one of movement of the fob, a received directional signal, or a received audible signal; determining, at the vehicle-access system, whether the value of the vehicle-authorization parameter is consistent or inconsistent with a desired function of the vehicle; and either: inhibiting the desired function of the vehicle in response to the value of the vehicle-authorization parameter being inconsistent with the desired function; or permitting the desired function of the vehicle in response to the value of the vehicle-authorization parameter being consistent with the desired function.

Implementations of such a method may include one or more of the following features. The vehicle-authorization parameter comprises movement of the fob, the desired function of the vehicle is vehicle starting, and the movement of the fob is determined to be consistent with the desired function if the movement of the fob is at least one of: a fob speed being below a vehicle-starting threshold; spatial fob motion being consistent with movement of a seat of the vehicle, the spatial fob motion comprising at least one of a direction or a magnitude of fob motion; or the spatial fob motion being consistent with a user of the fob sitting in the vehicle. The spatial fob motion being consistent with movement of the seat of the vehicle comprises the spatial fob motion differing from concurrent movement of at least a portion of the seat by less than a fob/seat-movement-differential threshold. The vehicle-authorization parameter comprises movement of the fob, the desired function of the vehicle is vehicle starting, and the movement of the fob is determined to be inconsistent with the desired function if the movement of the fob is spatial fob motion indicative of pedestrian motion. The vehicle-authorization parameter comprises movement of the fob, the desired function of the vehicle is vehicle driving, and the movement of the fob is determined to be consistent with the desired function if the movement of the fob is at least one of: spatial fob motion being consistent with a user of the fob sitting in the vehicle, the spatial fob motion comprising at least one of a direction or a magnitude of fob motion; a fob speed differing by less than a speed-differential threshold relative to a speed of the vehicle; or the spatial fob motion being consistent with movement of a seat of the vehicle. The spatial fob motion being consistent with movement of the seat of the vehicle comprises the spatial fob motion differing from concurrent movement of at least a portion of the seat by less than a fob/seat-movement-differential threshold. The vehicle-authorization parameter comprises movement of the fob, the desired function of the vehicle is vehicle driving, and the movement of the fob is determined to be inconsistent with the desired function if the movement of the fob is spatial fob motion indicative of pedestrian motion. The vehicle-authorization parameter comprises movement of the fob, the desired function of the vehicle is unlocking the vehicle, and the movement of the fob is determined to be consistent with the desired function if a fob speed is below a vehicle-unlocking threshold.

Also or alternatively, implementations of such a method may include one or more of the following features. The vehicle-authorization parameter is the received directional signal, and the value of the vehicle-authorization parameter is determined to be consistent with the desired function if the value of the vehicle-authorization parameter is non-zero. The value of the vehicle-authorization parameter is determined to be consistent with the desired function if the value of the vehicle-authorization parameter exceeds a non-zero directional-signal-intensity threshold. The directional signal is received by the fob from the vehicle. The directional signal is received by the vehicle from the fob. The vehicle-authorization parameter is the received audible signal, and the value of the vehicle-authorization parameter is determined to be consistent with the desired function if the value of the vehicle-authorization parameter is non-zero. The value of the vehicle-authorization parameter is determined to be consistent with the desired function if the value of the vehicle-authorization parameter exceeds a non-zero audible-signal-intensity threshold.

An example of an apparatus in a wireless vehicle-access system, that includes a vehicle and a fob, includes: means for obtaining a value of a vehicle-authorization parameter wherein the vehicle-authorization parameter comprises at least one of movement of the fob, a received directional signal, or a received audible signal; and vehicle function compatibility means comprising: means for determining whether the value of the vehicle-authorization parameter is consistent or inconsistent with a desired function of the vehicle; means for inhibiting the desired function of the vehicle in response to the value of the vehicle-authorization parameter being determined to be inconsistent with the desired function; and means for permitting the desired function of the vehicle in response to the value of the vehicle-authorization parameter being determined to be consistent with the desired function.

Implementations of such an apparatus may include one or more of the following features. The vehicle-authorization parameter comprises movement of the fob, wherein the desired function of the vehicle is vehicle starting, and wherein the means for determining are for determining that the movement of the fob is consistent with the desired function of the vehicle if the movement of the fob is at least one of: a fob speed being below a vehicle-starting threshold; spatial fob motion being consistent with movement of a seat of the vehicle, the spatial fob motion comprising at least one of a direction or a magnitude of fob motion; or the spatial fob motion being consistent with a user of the fob sitting in the vehicle. The spatial fob motion being consistent with movement of the seat of the vehicle comprises the spatial fob motion differing from concurrent movement of at least a portion of the seat by less than a fob/seat-movement-differential threshold. The vehicle-authorization parameter comprises movement of the fob, the desired function of the vehicle is vehicle starting, and the vehicle function compatibility means are for determining that the movement of the fob is inconsistent with the desired function if the movement of the fob is spatial fob motion indicative of pedestrian motion. The vehicle-authorization parameter comprises movement of the fob, the desired function of the vehicle is vehicle driving, and the vehicle function compatibility means are for determining that the movement of the fob is consistent with the desired function if the movement of the fob is at least one of: spatial fob motion being consistent with a user of the fob sitting in the vehicle, the spatial fob motion comprising at least one of a direction or a magnitude of fob motion; a fob speed differing by less than a speed-differential threshold relative to a speed of the vehicle; or the spatial fob motion being consistent with movement of a seat of the vehicle. The spatial fob motion being consistent with movement of the seat of the vehicle comprises the spatial fob motion differing from concurrent movement of at least a portion of the seat by less than a fob/seat-movement-differential threshold. The vehicle-authorization parameter comprises movement of the fob, the desired function of the vehicle is vehicle driving, and the vehicle function compatibility means are for determining that the movement of the fob is inconsistent with the desired function if the movement of the fob is spatial fob motion indicative of pedestrian motion. The vehicle-authorization parameter comprises movement of the fob, the desired function of the vehicle is unlocking the vehicle, and the vehicle function compatibility means are for determining that the movement of the fob is consistent with the desired function if a fob speed is below a vehicle-unlocking threshold.

Also or alternatively, implementations of such an apparatus may include one or more of the following features. The vehicle-authorization parameter is the received directional signal, and the vehicle function compatibility means are for determining that the value of the vehicle-authorization parameter is consistent with the desired function if the value of the vehicle-authorization parameter is non-zero. The vehicle function compatibility means are for determining that the value of the vehicle-authorization parameter is consistent with the desired function if the value of the vehicle-authorization parameter exceeds a non-zero directional-signal-intensity threshold. The vehicle-authorization parameter is the received audible signal, and the vehicle function compatibility means are for determining that the value of the vehicle-authorization parameter is consistent with the desired function if the value of the vehicle-authorization parameter is non-zero. The vehicle function compatibility means are for determining that the value of the vehicle-authorization parameter is consistent with the desired function if the value of the vehicle-authorization parameter exceeds a non-zero audible-signal-intensity threshold.

An example of a processor-readable storage medium in a wireless vehicle-access system, that includes a vehicle and a fob, includes processor-readable instructions configured to cause a processor to: obtain a value of a vehicle-authorization parameter wherein the vehicle-authorization parameter comprises at least one of movement of the fob, a received directional signal, or a received audible signal; determine whether the value of the vehicle-authorization parameter is consistent or inconsistent with a desired function of the vehicle; inhibit the desired function of the vehicle in response to the value of the vehicle-authorization parameter being determined to be inconsistent with the desired function; and permit the desired function of the vehicle in response to the value of the vehicle-authorization parameter being determined to be consistent with the desired function.

Implementations of such a processor-readable storage medium may include one or more of the following features. The vehicle-authorization parameter comprises movement of the fob, the desired function of the vehicle is vehicle starting, and the instructions configured to cause the processor to determine are configured to cause the processor to determine that the movement of the fob is consistent with the desired function of the vehicle if the movement of the fob is at least one of: a fob speed being below a vehicle-starting threshold; spatial fob motion being consistent with movement of a seat of the vehicle, the spatial fob motion comprising at least one of a direction or a magnitude of fob motion; or the spatial fob motion being consistent with a user of the fob sitting in the vehicle. The spatial fob motion being consistent with movement of the seat of the vehicle comprises the spatial fob motion differing from concurrent movement of at least a portion of the seat by less than a fob/seat-movement-differential threshold. The vehicle-authorization parameter comprises movement of the fob, the desired function of the vehicle is vehicle starting, and the instructions configured to cause the processor to determine are configured to cause the processor to determine that the movement of the fob is inconsistent with the desired function if the movement of the fob is spatial fob motion indicative of pedestrian motion. The vehicle-authorization parameter comprises movement of the fob, the desired function of the vehicle is vehicle driving, and the instructions configured to cause the processor to determine are configured to cause the processor to determine that the movement of the fob is consistent with the desired function if the movement of the fob is at least one of: spatial fob motion being consistent with a user of the fob sitting in the vehicle, the spatial fob motion comprising at least one of a direction or a magnitude of fob motion; a fob speed differing by less than a speed-differential threshold relative to a speed of the vehicle; or the spatial fob motion being consistent with movement of a seat of the vehicle. The spatial fob motion being consistent with movement of the seat of the vehicle comprises the spatial fob motion differing from concurrent movement of at least a portion of the seat by less than a fob/seat-movement-differential threshold. The vehicle-authorization parameter comprises movement of the fob, the desired function of the vehicle is vehicle driving, and the instructions configured to cause the processor to determine are configured to cause the processor to determine that the movement of the fob is inconsistent with the desired function if the movement of the fob is spatial fob motion indicative of pedestrian motion. The vehicle-authorization parameter comprises movement of the fob, the desired function of the vehicle is unlocking the vehicle, and the instructions configured to cause the processor to determine are configured to cause the processor to determine that the movement of the fob is consistent with the desired function if a fob speed is below a vehicle-unlocking threshold.

Also or alternatively, implementations of such a processor-readable storage medium may include one or more of the following features. The vehicle-authorization parameter is the received directional signal, and the instructions configured to cause the processor to determine are configured to cause the processor to determine that the value of the vehicle-authorization parameter is consistent with the desired function if the value of the vehicle-authorization parameter is non-zero. The instructions configured to cause the processor to determine are configured to cause the processor to determine that the value of the vehicle-authorization parameter is consistent with the desired function if the value of the vehicle-authorization parameter exceeds a non-zero directional-signal-intensity threshold. The vehicle-authorization parameter is the received audible signal, and the instructions configured to cause the processor to determine are configured to cause the processor to determine that the value of the vehicle-authorization parameter is consistent with the desired function if the value of the vehicle-authorization parameter is non-zero. The instructions configured to cause the processor to determine are configured to cause the processor to determine that the value of the vehicle-authorization parameter is consistent with the desired function if the value of the vehicle-authorization parameter exceeds a non-zero audible-signal-intensity threshold.

Another example of an apparatus in a wireless vehicle-access system, that includes a vehicle and a fob, includes: a fob movement module configured to determine movement of the fob; a vehicle movement module configured to determine vehicle movement, of at least a portion of the vehicle, that is concurrent with the movement of the fob; and a vehicle function compatibility module configured to: determine whether the movement of the fob and the vehicle movement are consistent or inconsistent with each other; inhibit a desired function of the vehicle in response to the movement of the fob and the vehicle movement being inconsistent with each other; and permit the desired function of the vehicle in response to the movement of the fob and the vehicle movement being consistent with each other.

Implementations of such an apparatus may include one or more of the following features. The movement of the fob comprises at least one of a direction or a magnitude of fob motion and the vehicle movement comprises at least one of a direction or a magnitude of motion of the at least a portion of the vehicle. The movement of the fob and the vehicle movement are consistent with each other if the movement of the fob differs from the vehicle movement by less than a fob/vehicle-movement-differential threshold. The at least a portion of the vehicle comprises at least a portion of a seat of the vehicle. The at least a portion of the seat of the vehicle comprises a cover of the seat of the vehicle and the movement of the fob and the vehicle movement are consistent with each other if the magnitude and direction of the movement of the fob differ from the magnitude and direction of the vehicle movement by less than a fob/seat-movement-differential threshold. The desired function of the vehicle comprises at least one of unlocking the vehicle or driving the vehicle.

Items and/or techniques described herein may provide one or more of the following capabilities, as well as other capabilities not mentioned. Relay attacks on wireless vehicle access systems may be inhibited, e.g., prevented. A vehicle accessed through a relay attack may still not be able to be driven using the relay attack, for example by determining whether a driven vehicle corresponds to a fob indicative of pedestrian motion, or motion inconsistent with motion of the vehicle. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Techniques are provided for inhibiting relay attacks, in particular with respect to vehicle operations. Entry into a vehicle, starting of a vehicle, and/or driving of a vehicle by spoofing a wireless vehicle key fob may be inhibited by using sensed information at the key fob and/or the vehicle. Similar sensors may be used at both the vehicle and the key fob to inhibit unauthorized use, e.g., vehicle access, starting, and/or driving. For example, a location determined using a satellite positioning system (SPS) at both the key fob and vehicle may be required to be within a threshold distance to authorize a vehicle operation. As another example, accelerometer and/or gyroscope information in the key fob that is similar to accelerometer and/or gyro information from the vehicle may be required to authorize driving of the vehicle. As another example, accelerometer and/or gyroscope information in the key fob that is consistent with sensors of vehicle seat movement may be required to authorize vehicle start. As another example, sensed information at the key fob from the vehicle, or vice versa, that is of a nature that would raise suspicion if provided or sensed by an unauthorized person (e.g., because the information is directional, audible, etc.) may be used to authorize use of one or more vehicle operations. Still other examples may be implemented in accordance with the disclosure herein.

Figure 1:
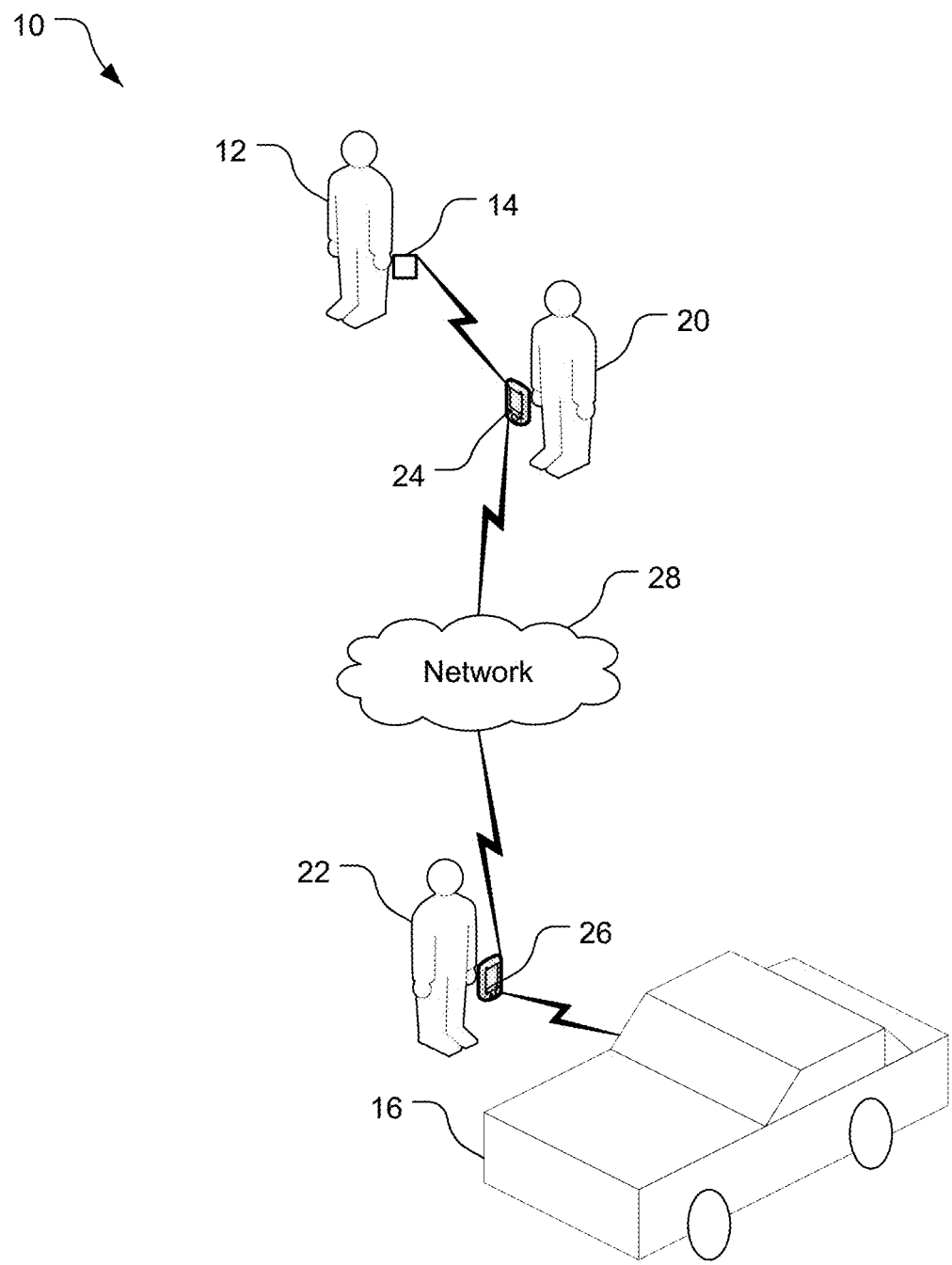
FIG. 1 is a simplified diagram of a relay attack scenario for a wireless vehicle-access system.

Referring to FIG. 1, a relay attack scenario 10 includes a vehicle user 12, a fob 14, a vehicle 16, a user-end relay attacker 20, a vehicle-end relay attacker 22, a user-end relay device 24, a vehicle-end relay device 26, and a network 28. Together the fob 14 and the vehicle 16 form at least a portion of a wireless vehicle-access system. The fob 14 and the vehicle 16 may form the entire wireless vehicle-access system or there may be one or more other components, e.g., a server that may be used to authenticate the fob 14 and/or the vehicle 16, to encrypt data, etc. The fob 14 is configured to communicate directly with the vehicle 16 to obtain one or more vehicle functions, e.g., unlocking the vehicle, starting the vehicle, or driving the vehicle (e.g., running the motor, allowing/assisting steering of the vehicle, etc.). In the scenario 10, the fob communicates indirectly to the vehicle 16 through the relay devices 24, 26 of the relay attackers 20, 22. The user-end relay attacker 20 is disposed near the user 12 while the vehicle-end relay attacker 22 is disposed near the vehicle 16. The relay devices 24, 26 relay short-range wireless communications from the fob 14 and the vehicle 16, respectively, to the network 28 and relay communications from the network 28 to the fob 14 and the vehicle 16, respectively, so that the relay devices 24, 26 give the appearance to the fob 14 and the vehicle 16 of direct communication between the fob 14 and the vehicle 16. The fob 14 and/or the vehicle 16, however, are configured as discussed below to hinder success of attempted relay attacks such as that shown in FIG. 1.

Figure 2:
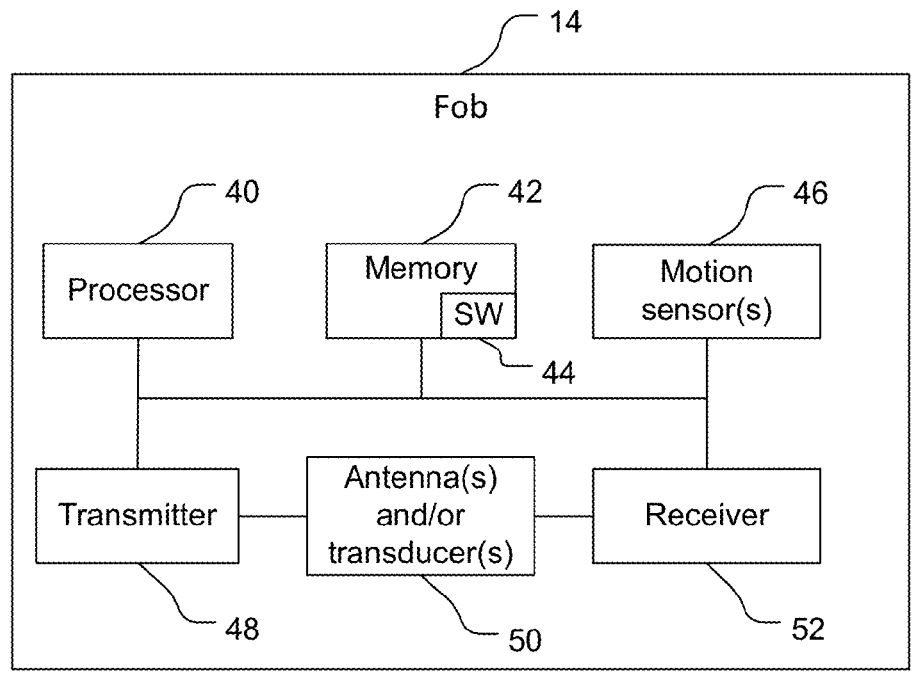
FIG. 2 is a block diagram of components of an example of a fob shown in FIG. 1.

Referring to FIG. 2, an example of the fob 14 comprises a computer system including a processor 40, a memory 42 including software 44, one or more motion sensors 46, a transmitter 48, one or more antennas and/or one or more transducers 50, and a receiver 52. The fob 14 may take any of a variety of forms, e.g., a key fob, a cellular device (e.g., a cellular phone such as a smart phone), a tablet computer, a personal digital assistant, etc. The processor 40 is preferably an intelligent hardware device, e.g., a central processing unit (CPU) such as those made by ARM®, Intel® Corporation, or AMD®, a microcontroller, an application specific integrated circuit (ASIC), etc. The processor 40 could comprise multiple separate physical entities that can be distributed in the fob 14. The memory 42 includes random access memory (RAM) and read-only memory (ROM). The memory 42 is a processor-readable storage medium that stores the software 44 which is processor-readable, processor-executable software code containing processor-readable instructions that are configured to, when executed, cause the processor 40 to perform various functions described herein (although the description may refer only to the processor 40 performing the functions). Alternatively, the software 44 may not be directly executable by the processor 40 but configured to cause the processor 40, e.g., when compiled and executed, to perform the functions. The processor 40 is communicatively coupled to the memory 42, the motion sensor(s) 46, the transmitter 48 and the receiver 52 (and thus the antenna(s) and/or the transducer(s) 50). The transmitter 48 and the receiver 52 are configured to send signals/information to, and receive signals/information from, respectively, the vehicle 16 via the antenna(s) and/or the transducer(s) 50. The transmitter 48 is configured to interact with one or more of the antenna(s) and/or transducer(s) 50. The receiver 52 is optional and if present is configured to interact with one or more of the antenna(s) and/or transducer(s) 50. The transmitter 48, one or more of the antenna(s) and/or transducer(s) 50, and/or the receiver 52 may be configured to communicate according to one or more wireless protocols such as a short-range wireless protocol, e.g., the Bluetooth® protocol. Further, the antenna(s) 50 may include a highly directional antenna configured to transmit and receive a directional signal. For example, the highly directional antenna 50 may have a 3 dB bandwidth of 10°, 8°, 5°, 4°, or 4°, etc. The transducer(s) 50, if present, is (are) configured to convert between electrical signals and sound waves, e.g., to convert electrical signals from the transmitter 48 into corresponding send sound waves and to transmit the corresponding sound waves, or to receive and convert sound waves into corresponding electrical signals, and send the corresponding electrical signals to the receiver 52.

The motion sensor(s) 46 comprise one or more sensors configured to determine movement parameters and to provide indications of any determined parameter. Movement may comprise, e.g., speed, acceleration, orientation change (e.g., as determined by a gyroscope), magnetic pole detection, satellite positioning system (SPS) location changes, or combinations of any of these. For example, the motion sensor(s) 46 may include one or more gyroscopes and/or accelerometers that can determine speed, acceleration, orientation, and/or direction of motion. The motion sensor(s) 46 may provide indications of speed, acceleration, and/or direction of motion of the fob 14. For example, a magnitude of speed and/or acceleration of the fob 14 and/or a specification (e.g., degrees) of direction of movement of the fob 14 may be provided. The motion sensor(s) 46 may comprise a nine-axis sensor that includes a three-direction magnetometer, a three-dimensional gyroscope, and a three-dimensional accelerometer.

Figure 3:
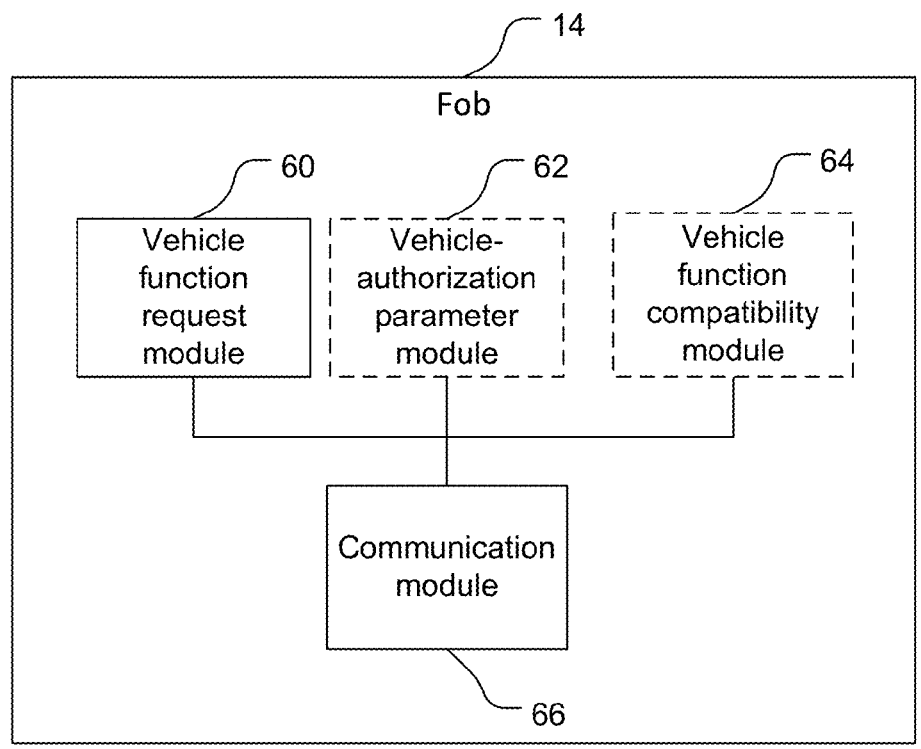
FIG. 3 is a functional-block diagram of the fob shown in FIG. 2.

Referring to FIG. 3, with further reference to FIG. 2, the fob 14 includes a vehicle function request module (means for requesting a vehicle function) 60, a vehicle-authorization parameter module (means for obtaining a value of a vehicle-authorization parameter) 62, a vehicle function compatibility module (vehicle function compatibility means) 64, and a communication module (communicating means) 66. The modules 60, 62, 64, 66 are functional modules implemented by the processor 40 and the software 44 stored in the memory 42, although the modules 60, 62, 64, 66 may be implemented in hardware, firmware, or software, or combinations of these. Thus, reference to the modules 60, 62, 64, 66 performing or being configured to perform a function is shorthand for the processor 40 performing or being configured to perform the function in accordance with the software 44 (and/or firmware, and/or hardware of the processor 40). Similarly, reference to the processor 40 performing a function is equivalent to the appropriate module(s) 60, 62, 64, 66 performing the function.

The vehicle function request module 60 is configured to send a request for performance of one or more vehicle functions to the vehicle 16. The requested function may be any of a variety of functions including unlocking the vehicle 16, starting the vehicle 16, or driving the vehicle 16. Starting the vehicle 16 includes initial motor actuation (e.g., causing an internal-combustion engine to run) or enablement (e.g., of an electric motor) and/or starting one or more other powered features of the vehicle 16, e.g., a phone system, a remote access system (e.g., including a garage-door opener), etc. Driving the vehicle 16 includes ongoing operation of the motor (i.e., the desired function allows a user to be able to move the vehicle 16 as desired, or even the vehicle 16 moving itself, e.g., according to computer-determined guidance). The vehicle function request module 60 is configured to send the request for performance of the function(s) via the transmitter 48 and one or more of the antenna(s) and/or transducer(s) 50 toward the vehicle 16. The module 60 may send the request in response to user input, on the vehicle function request module's own initiative, or in response to a communication received by the fob 14, e.g., from the vehicle 16. For example, a user of the fob 14 may actuate a button to cause the module 60 to request an unlocking function. As another example, a motor of the vehicle 16 may be running and the vehicle 16 may, e.g., intermittently (e.g., periodically), send a communication to the fob 14 (e.g., to determine the presence of the fob 14 by asking the fob 14 to send a driving request) to which the module 60 responds by sending the request. In this latter case, the request may be an acknowledgement, and thus an implicit request without an explicit call for the vehicle 16 to perform a function.

Optionally, the fob 14 includes the vehicle-authorization parameter module 62. The vehicle-authorization parameter module 62 is configured to obtain a value of a vehicle-authorization parameter. The vehicle authorization parameter is a measurable factor that is relevant for providing authorization for one or more vehicle functions. More than one vehicle-authorization parameter may be determined, for example, at least one of movement of the fob 14, a received directional signal, or a received audible signal. The module 62 may determine that the parameter has a non-zero value while not determining a specific non-zero value of the vehicle-authorization parameter.

The vehicle-authorization parameter module 62 may determine motion of the fob 14 based on information from the motion sensor(s) 46. The module 62 may thus be a fob movement module. The determined motion may include, e.g., speed, acceleration, magnitude of movement, and/or direction of motion of the fob 14. The magnitude and/or direction of the determined motion may be absolute (i.e., relative to the Earth) or relative, e.g., relative to the vehicle 16 if information regarding the motion of the vehicle 16 is available to the module 62, e.g., sent from the vehicle 16. The module 62 may be provided with or determine vehicle movement and may thus be a vehicle movement module. If vehicle motion information is available, then the module 62 may remove vehicle motion components from the fob motion to determine the fob motion relative to the vehicle 16. Also or alternatively, the module 62 may attempt to remove vehicle motion even without vehicle motion information being available from the vehicle, e.g., by removing average horizontal motion from the fob motion. For example, if the average fob motion over a prior period of time, e.g., three seconds, five seconds, ten seconds, etc., then this motion may be removed from the motion over the last one second (or other time frame) to attempt to determine motion of the fob 14 relative to the vehicle 16.

The vehicle-authorization parameter module 62 may determine a value of a received directional signal using the antenna(s) and/or transducer(s) 50. The directional signal may be a signal transmitted by a directional antenna and received by a directional or non-directional antenna (i.e., an antenna that is not highly directional), or may be a signal transmitted by a non-directional antenna and received by a directional antenna. Thus, a non-directional (or at least not highly directional) signal may be transmitted by the vehicle 16 and received by a directional antenna at the fob 14. Alternatively, a directional signal (e.g., with a 3 dB bandwidth less than 10°) may be transmitted toward the fob 14 and the directional signal received by a directional antenna and/or a non-directional antenna of the antenna(s) 50. The module 62 may determine that a directional signal has been received with a non-zero magnitude. The module 62 may determine the magnitude of the received directional signal.

The vehicle-authorization parameter module 62 may determine a value of a received audible signal using the transducer(s) 50. The transducer(s) 50 may indicate whether an audible signal is received by the fob 14, and may indicate a value, e.g., a decibel value, of the audible signal received.

Optionally, the fob 14 includes the vehicle function compatibility module 64. The module 64 may be configured to determine (i.e., may include means for determining) whether the value of the vehicle-authorization parameter is consistent or inconsistent with a desired function of the vehicle 16. The module 64 may make this determination on its own (using information produced by the fob 14 and/or the vehicle 16 and/or another source), or may be provided with this determination, e.g., from the vehicle 16. The module 64 may be configured to inhibit (i.e., may include means for inhibiting) the desired function of the vehicle 16 in response to the value of the vehicle-authorization parameter being determined to be inconsistent with the desired function and to permit (i.e., include means for permitting) the desired function of the vehicle 16 in response to the value of the vehicle-authorization parameter being determined to be consistent with the desired function. For example, to inhibit the desired function, the vehicle function compatibility module 64 may inhibit the vehicle function request module 60 from sending a request for the desired function, may inhibit communication with the vehicle 16 other than the request (e.g., inhibit confirmation of compatibility with the request, inhibit confirmation of the request, inhibit any further information required by the vehicle 16, etc.), may cause alerts (whether to law enforcement, private security companies, the user, etc.), may cause information to be logged to provide forensic evidence, or any combination of such actions or related actions. When logging mode is entered, contextual information such as camera imagery, microphone input, location and speed, and/or other sensory information may be recorded, locally stored, and transmitted to an external party such as law enforcement. Thus, as used herein, inhibiting the desired vehicle function may include preventing the vehicle 16 from performing the function, affecting or modifying (e.g., impeding or diminishing) the ability of the vehicle 16 to perform the function or the likelihood of the vehicle 16 performing the function, and/or taking action that makes continuing performance of the function undesirable (e.g., to an unauthorized driver of the vehicle 16).

The determination of the value of the vehicle-authorization parameter being consistent or inconsistent with the desired function may be done in a variety of manners, and may depend on the desired function. For example, different criteria may be used for unlocking the vehicle 16, starting the vehicle 16, or driving the vehicle 16. For example, the module 64 may determine whether a speed of the fob 14 is below a vehicle-unlocking threshold, with the speed being below the vehicle-unlocking threshold being consistent with starting the vehicle 16.

The following are examples of criteria that may be used to determine whether the vehicle-authorization parameter is consistent or inconsistent with starting the vehicle 16. For example, the module 64 may determine whether a speed of the fob 14 is below a vehicle-starting threshold, with the speed being below the vehicle-starting threshold being consistent with starting the vehicle 16. As another example, the module 64 may determine whether spatial fob motion is consistent with movement of a seat of the vehicle 16 (i.e., at least a portion of the seat). The spatial fob motion may include a magnitude and/or a direction of fob motion. The spatial fob motion being similar to motion of the seat would be consistent with starting the vehicle 16. For example, the module 64 may determine that movement of the fob 14 differs from concurrent movement of the seat by less than a fob/seat-movement-differential threshold, e.g., that downward movement of the fob 14 by X inches occurs concurrently with compression of a seat bottom cushion of X inches ±0.1X inches is consistent with starting of the vehicle 16. The fob/seat-movement-differential threshold may comprise a magnitude (e.g., distance), a direction, or both magnitude and direction (e.g., a magnitude threshold component and a direction threshold component, or a composite of magnitude and direction). The module 64 may require the concurrent movement to occur within one or more threshold times before or after a request to start the vehicle 16 (e.g., a threshold for occurrence before the request may differ from a threshold for occurrence after the request). As another example, the module 64 may determine whether spatial fob motion is consistent with the vehicle user 12 sitting in the vehicle 16, e.g., being stationary or an acceleration magnitude being below a threshold. As another example, the module 64 may determine whether fob movement is indicative of pedestrian motion (e.g., walking, running, etc.). The module 64 may determine that the fob movement is inconsistent with starting the vehicle 16 if the fob movement is indicative of pedestrian motion (e.g., cyclic up and down motion) because the vehicle user 12 should not be walking when starting the vehicle 16, unless the vehicle starting is a remote starting.

The following are examples of criteria that may be used to determine whether the vehicle-authorization parameter is consistent or inconsistent with driving the vehicle 16. For example, the module 64 may determine whether spatial fob motion (e.g., magnitude and/or direction) is consistent with the vehicle user 12 sitting in the vehicle 16, e.g., having a speed above a threshold, moving in a direction similar to the vehicle 16, or otherwise having motion similar to motion of the vehicle 16. As another example, the module 64 may determine whether a speed of the fob 14 differs by less than a speed-differential threshold relative to a speed of the vehicle 16 or that movement of the fob 14 differs from movement of the vehicle 16 by less than a fob/vehicle-movement-differential threshold (e.g., including speed, acceleration, magnitude of motion, and/or direction of movement, etc.). As another example, the module 64 may determine whether spatial fob motion is consistent with movement of a seat of the vehicle 16 (i.e., at least a portion of the seat). The spatial fob motion may include a magnitude and/or a direction of fob motion. The spatial fob motion being similar to motion of the seat would be consistent with starting the vehicle 16. For example, the module 64 may determine that movement of the fob 14 differs from concurrent movement of the seat by less than a fob/seat-movement-differential threshold, e.g., that rearward movement of the fob 14 by X inches occurs concurrently with positive acceleration of the vehicle 16, with the value of X dependent upon a value of the acceleration. The module 64 may require the concurrent movement to occur within one or more threshold times before or after a request to confirm or verify that driving the vehicle 16 should be authorized (e.g., an intermittent request by the vehicle 16). As another example, the module 64 may determine whether fob movement is indicative of pedestrian motion (e.g., walking, running, etc.). The module 64 may determine that the fob movement is inconsistent with driving the vehicle 16 if the fob movement is indicative of pedestrian motion (e.g., cyclic up and down motion) because the vehicle user 12 should not be walking when driving the vehicle 16. The module 64 may receive appropriate information (e.g., speed of the vehicle) from the vehicle 16 in order to make a corresponding determination (e.g., that the fob speed and vehicle speed are within a threshold value of each other).

The vehicle function compatibility module 64 may determine that the vehicle-authorization parameter is consistent with a desired vehicle function if the vehicle-authorization parameter is a directional signal or an audible signal with a non-zero value. The module 64 may determine that the vehicle-authorization parameter is consistent with a desired vehicle function only if the value of the directional signal or audible signal is above a non-zero directional-signal-intensity threshold or above a non-zero audible-signal-intensity threshold, respectively. The module 64 may receive appropriate information (e.g., intensity of a received directional or audible signal) from the vehicle 16 in order to make a corresponding determination.

In order to receive the directional signal at the fob 14 with sufficient magnitude for the module 62 to determine that the directional signal has been received or for the module 64 to determine that the received signal meets a compatibility magnitude threshold, the entity, e.g., the vehicle 16 or the user-end relay device 24, may need to be in a directional relationship (e.g., within a threshold angular direction of a bore sight of the directional antenna 50) with the directional antenna 50. Maintaining an acceptable directional relationship with the directional antenna 50 may draw the attention of the vehicle user 12 to the user-end relay attacker 20, particularly if the fob 14 is moving. In order to receive the audible signal at the fob 14 with sufficient magnitude for the module 64 to determine that the audible signal meets a compatibility magnitude threshold, the entity, e.g., the vehicle 16 or the user-end relay device 24, may need to be close enough or produce a loud enough sound to draw the attention of the vehicle user 12 to the user-end relay device 24 if the user-end relay device 24 is producing the audible sound. If the attention of the vehicle user 12 is drawn to the user-end relay device 24 (e.g., because of suspicious movement of the user-end relay attacker 24 or production of the audible sound), then the vehicle user 12 may take one or more measures to inhibit the relay attack, e.g., move away from the user-end relay attacker 24, move the fob 14, inhibit further communications from the fob 14 (at least temporarily), e.g., by turning the fob 14 off, turning the communication module 66 off, etc.

The communication module 66 is configured to communicate with the vehicle 16, e.g., to report information, to send function requests, to provide information from which a conclusion may be drawn regarding providing a desired vehicle function, to provide a conclusion regarding the provision of a desired vehicle function, etc. For example, the module 66 may send a request to unlock the vehicle 16 in response to the user 12 pressing a button on the fob 14, touching a screen, etc. The request may be, e.g., to move the locks from the locked to the unlock position, to open a trunk, etc. The module 66 may send a request to start the vehicle 16 in response to the user 12 pressing a button on the fob 14, the user 12 touching a portion of a screen, the user 12 inserting the fob 14 into a receptacle and turning, etc. The module 66 may send a driving-consistent message in response to the vehicle 16 requesting this information, e.g., intermittently. The module 66 may send one or more of these communications, or other communications, to the vehicle 16 through the transmitter 48 and the antenna(s) and/or transducer(s) 50.

Figure 4:
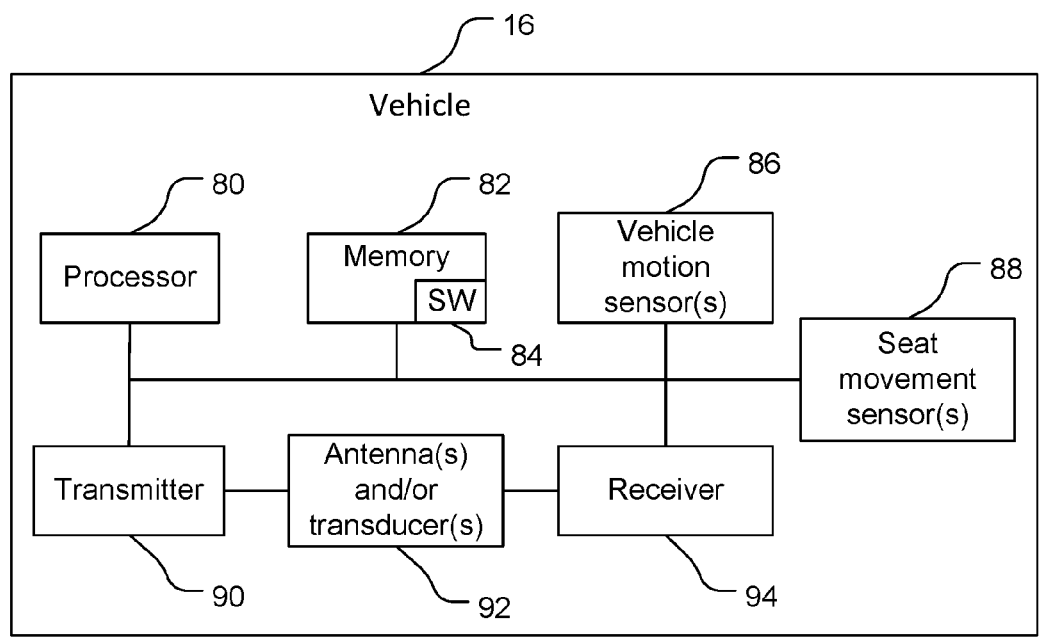
FIG. 4 is a block diagram of components of an example of a vehicle shown in FIG. 1.

Referring to FIG. 4, an example of the vehicle 16 comprises a computer system including a processor 80, a memory 82 including software 84, one or more vehicle motion sensors 86, one or more seat movement sensors 88, a transmitter 90, one or more antennas and/or one or more transducers 92, and a receiver 94. The processor 80 is preferably an intelligent hardware device, e.g., a central processing unit (CPU) such as those made by ARM®, Intel® Corporation, or AMD®, a microcontroller, an application specific integrated circuit (ASIC), etc. The processor 80 could comprise multiple separate physical entities that can be distributed in the vehicle 16. The memory 82 includes random access memory (RAM) and read-only memory (ROM). The memory 82 is a processor-readable storage medium that stores the software 84 which is processor-readable, processor-executable software code containing processor-readable instructions that are configured to, when executed, cause the processor 80 to perform various functions described herein (although the description may refer only to the processor 80 performing the functions). Alternatively, the software 84 may not be directly executable by the processor 80 but configured to cause the processor 80, e.g., when compiled and executed, to perform the functions. The processor 80 is communicatively coupled to the memory 82, the motion sensor(s) 86, the seat movement sensor(s) 88, the transmitter 90 and the receiver 94 (and thus the antenna(s) and/or the transducer(s) 92). The transmitter 90 and the receiver 94 are configured to send signals/information to, and receive signals/information from, respectively, the fob 14 via the antenna(s) and/or the transducer(s) 92. The transmitter 90 is configured to interact with one or more of the antenna(s) and/or transducer(s) 92. The receiver 94 is optional and if present is configured to interact with one or more of the antenna(s) and/or transducer(s) 92. The transmitter 90, one or more of the antennas 92, and/or the receiver 94 may be configured to communicate according to one or more wireless protocols such as a short-range wireless protocol, e.g., the Bluetooth® protocol. Further, the antenna(s) 92 may include a highly directional antenna configured to transmit and receive a directional signal. For example, the highly directional antenna 92 may have a 3 dB bandwidth of 10°, 8°, 5°, 4°, or 4°, etc. The transducer(s) 92, if present, is(are) configured to convert between electrical signals and sound waves, e.g., to convert electrical signals from the transmitter 90 into corresponding send sound waves and to transmit the corresponding sound waves, or to receive and convert sound waves into corresponding electrical signals, and send the corresponding electrical signals to the receiver 94.

The motion sensor(s) 86 comprise one or more sensors configured to determine movement parameters and to provide indications of any determined parameter. For example, the motion sensor(s) 86 may include one or more gyroscopes and/or accelerometers that can determine speed, acceleration, and/or direction of motion. The motion sensor(s) 86 may provide indications of speed, acceleration, and/or direction of motion of the vehicle 16. For example, a magnitude of speed and/or acceleration of the vehicle 16 and/or a specification (e.g., degrees) of direction of movement of the vehicle 16 may be provided. The motion sensor(s) 86 may comprise a nine-axis sensor that includes a three-direction magnetometer, a three-dimensional gyroscope, and a three-dimensional accelerometer.

Figure 5:
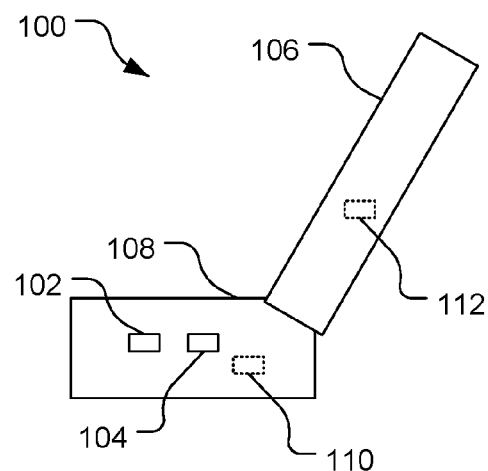
FIG. 5 is a simplified side view of a seat of the vehicle shown in FIG. 1.

Referring also to FIG. 5, the seat movement sensor(s) 88 comprise one or more sensors for determining movement of a seat 100 of the vehicle 16. The sensor(s) 88 may determine movement of the seat 100 in its entirety, and/or may determine movement of one or more portions of the seat 100. Thus, the seat movement may be of the entire seat 100 or a portion of the seat 100. The sensor(s) 88 may determine seat movement relative to the vehicle 16 (e.g., a body or frame of the vehicle 16) or relative to Earth, e.g., using one or more sensors similar to the sensor(s) 86. For example, the sensor(s) 88 may determine movement of the seat 100 relative to the vehicle 16 by determining forward/backward, up/down, and/or tilt seat adjustments induced by actuators 102, 104, respectively. The user 12 may move the actuator 102 to adjust the front-to-back location and/or the height of the seat 100 relative to the vehicle 16. The user 12 may move the actuator 104 to adjust a tilt of a seatback 106 of the seat 100 relative to the vehicle 16. One or more motors or other mechanisms that physically move the seat 100 in response to the actuators 102, 104 being actuated may provide movement indications, and thus may be one or more of the sensor(s) 88. Also or alternatively, the sensor(s) 88 may include a sensor 110 configured to determine compression or expansion of a seat bottom 108, and/or a sensor 112 configured to determine compression or expansion of the seatback 106. That is, the sensors 108, 110 may determine compression of the seat bottom 108 or seatback 106, e.g., in response to the user 12 initially sitting on the seat 100, or moving on the seat 100 after sitting down and may determine expansion of the seat bottom 108 or seatback 106, e.g., in response to the user moving on the seat 100 after sitting down, or getting off of the seat 100. More sensors than shown may be used in the seat 100, e.g., to sense compression, etc. of portions of the seatback 106 and/or various portions of the seat bottom 108, and/or other portions of a seat, e.g., a head rest (not shown).

Figure 6:
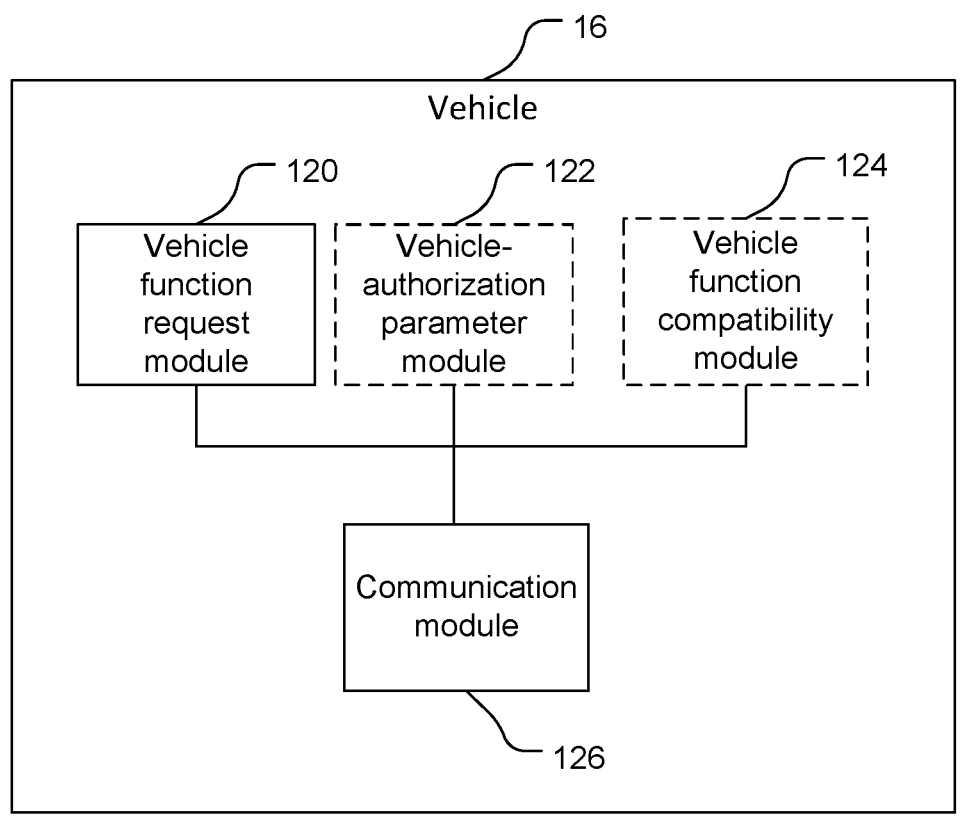
FIG. 6 is a functional-block diagram of the vehicle shown in FIG. 4.

Referring to FIG. 6, with further reference to FIGS. 1 and 4-5, the vehicle 12 includes a vehicle function request module (means for requesting a vehicle function) 120, a vehicle-authorization parameter module (means for obtaining a value of a vehicle-authorization parameter) 122, a vehicle function compatibility module (vehicle function compatibility means) 124, and a communication module 126. The modules 120, 122, 124, 126 are functional modules implemented by the processor 80 and the software 84 stored in the memory 82, although the modules 120, 122, 124, 126 may be implemented in hardware, firmware, or software, or combinations of these. Thus, reference to the modules 120, 122, 124, 126 performing or being configured to perform a function is shorthand for the processor 80 performing or being configured to perform the function in accordance with the software 84 (and/or firmware, and/or hardware of the processor 80). Similarly, reference to the processor 80 performing a function is equivalent to the appropriate module(s) 120, 122, 124, 126 performing the function.

The vehicle function request module 120 is configured to receive a request for performance of one or more vehicle functions. The requested function may be any of a variety of functions, e.g., as discussed above. The request may be received from outside the vehicle 16 through the antenna(s) and/or transducer(s) 92, or from inside the vehicle 16, e.g., produced by the processor 80 and the software 84. For example, the processor 80 and the software 84 may produce an intermittent request to confirm driving authorization. In response to this request, the module 120 may send a communication to the fob 14 (e.g., to determine the presence of the fob 14 by asking the fob 14 to send a driving request) to which the fob 14 responds by sending a driving request to the vehicle 16. The driving request may be an acknowledgement of the communication sent to the fob 14, and thus an implicit request without an explicit call for the vehicle 16 to perform a function.

Optionally, the vehicle 16 includes the vehicle-authorization parameter module 122. The vehicle-authorization parameter module 122 is configured to obtain a value of a vehicle-authorization parameter. More than one vehicle-authorization parameter may be determined, for example, at least one of movement of the fob 14, a received directional signal, or a received audible signal. The module 122 may determine that the parameter has a non-zero value while not determining a specific non-zero value of the vehicle-authorization parameter.

The vehicle-authorization parameter module 122 may determine motion of the fob 14 based on information received from the fob 14, e.g., as determined by the motion sensor(s) 46. The module 122 may thus be a fob movement module. The information received from the fob 14 may be raw measurements from which the module 122 determines the motion, or may be one or more indications of the motion determined by the fob 14. The determined motion may include, e.g., speed, acceleration, magnitude of movement, and/or direction of motion of the fob 14 as discussed above. The module 122 may determine vehicle motion information, e.g., using information from the motion sensor(s) 86, and may remove vehicle motion components from the fob motion to determine the fob motion relative to the vehicle 16. The module 122 may thus be a vehicle movement module.

The vehicle-authorization parameter module 122 may determine a value of a received directional signal using the antenna(s) and/or transducer(s) 92. The directional signal may be a signal transmitted by a directional antenna of the fob 14 and received by a directional or non-directional antenna (i.e., an antenna that is not highly directional) of the vehicle 16, or may be a signal transmitted by a non-directional antenna of the fob 14 and received by a directional antenna of the vehicle 16. Thus, a non-directional (or at least not highly directional) signal may be transmitted by the fob 14 and received by a directional antenna 92 at the vehicle 16. Alternatively, a directional signal (e.g., with a 3 dB bandwidth less than 10°) may be transmitted from the fob 14 (using a directional antenna of the antenna(s) 50) and the directional signal received by a directional antenna and/or a non-directional antenna of the antenna(s) 92. The directional signal from the fob 14 may be sent in response to user input (e.g., pushing a button), in response to a request from the vehicle 16 (e.g., after initial handshaking between the fob 14 and the vehicle 16 for unlocking or starting, a repeated request during driving, etc.), intermittently without a request from the vehicle 16 (e.g., as a probe to see if the vehicle 16 is within communication range), etc. The module 122 may determine that a directional signal has been received with a non-zero magnitude. The module 122 may determine the magnitude of the received directional signal.

The vehicle-authorization parameter module 122 may determine a value of a received audible signal using the transducer(s) 92. The transducer(s) 92 may indicate whether an audible signal is received by the vehicle 16, and may indicate a value, e.g., a decibel value, of the audible signal received.

Optionally, the vehicle 16 includes the vehicle function compatibility module 124. The module 124 may be configured to determine (i.e., include means for determining) whether the value of the vehicle-authorization parameter is consistent or inconsistent with a desired function of the vehicle 16. The module 124 may make this determination on its own (using information provided by the fob 14 and/or the vehicle 16 and/or another source), or may be provided with this determination, e.g., from the fob 14. The module 124 may be configured to inhibit (i.e., include means for inhibiting) the desired function of the vehicle 16 in response to the value of the vehicle-authorization parameter being determined to be inconsistent with the desired function and to permit (i.e., include means for permitting) the desired function of the vehicle 16 in response to the value of the vehicle-authorization parameter being determined to be consistent with the desired function. For example, to inhibit the desired function, the vehicle function compatibility module 124 may inhibit one or more electronic locks of the vehicle 16 from being unlocked, may inhibit a starter motor from engaging, or may inhibit continued operation of an engine of the vehicle 16 (while allowing continued use of other portions of the vehicle 16 such as brakes and steering). The module 124 may also or alternatively turn on the horn, send out alert signals, or limit the speed at which the vehicle 16 can be driven, and/or provide incorrect GPS guidance information causing the driver to take the vehicle 16 to a location where the driver can be apprehended.

The determination of the value of the vehicle-authorization parameter being consistent or inconsistent with the desired function may be done in a variety of manners, and may depend on the desired function. For example, different criteria may be used for unlocking the vehicle 16, starting the vehicle 16, or driving the vehicle 16. For example, the module 124 may determine whether a speed of the fob 14 is below a vehicle-unlocking threshold, with the speed being below the vehicle-unlocking threshold being consistent with starting the vehicle 16. The vehicle function compatibility module 124 may be configured similarly to the vehicle function compatibility module 64 of the fob 14 to determine whether the vehicle-authorization parameter is consistent or inconsistent with starting and/or driving the vehicle 16 using criteria as discussed above. Alternatively, this functionality may be split between the modules 64, 124.

The vehicle function compatibility module 124 may determine that the vehicle-authorization parameter is consistent with a desired vehicle function if the vehicle-authorization parameter is a directional signal or an audible signal with a non-zero value. The module 124 may determine that the vehicle-authorization parameter is consistent with a desired vehicle function only if the value of the directional signal or audible signal is above a non-zero directional-signal-intensity threshold or above a non-zero audible-signal-intensity threshold, respectively. The module 124 may receive appropriate information (e.g., intensity of a received directional or audible signal) from the vehicle 16 in order to make a corresponding determination.

In order for the user-end relay device 24 to receive a directional signal from the fob 14, the relay device 24 would need to be properly disposed relative to the fob 14. This may require the user-end relay device 24 to be moved around the fob 14, and thus the user 12, until the directional signal is received, and may require the relay device 24 to be moved repeatedly to receive the directional signal if the fob 14 is moving. This may make the relay attack obvious to the user 12, thus allowing the user 12 to take appropriate action (e.g., disabling the directional signal, directing the directional signal away from the relay device 24, reporting the user-end relay attacker 20 to a police officer, etc.).

In order to receive the audible signal at the vehicle 16, the fob 14 may need to produce the audible signal so that the user-end relay device 24 can relay or indicate to the vehicle-end relay device 26 what sound to produce. The production of the audible sound by the fob 14, in the absence of action by the user 12 to initiate the sound, may alert the user 12 to the relay attack, thus allowing the user to take appropriate action.

The communication module 126 is configured to communicate with the fob 14. For example, the communication module 126 may receive function requests, may receive raw information from which a conclusion may be drawn regarding providing a desired vehicle function, may receive a conclusion regarding whether to provide the desired vehicle function, and/or may provide a conclusion regarding the provision of a desired vehicle function, etc. For example, the module 126 may receive a request to unlock the vehicle 16 in response to the user 12 pressing a button on the fob 14, touching a screen, etc. The request may be, e.g., to move the locks from the locked to the unlock position, to open a trunk, etc. The module 126 may receive a request to start the vehicle 16 in response to the user 12 pressing a button on the fob 14, the user 12 touching a portion of a screen, the user 12 inserting the fob 14 into a receptacle and turning, etc. The module 126 may receive a driving-consistent message in response to the vehicle 16 requesting this information, e.g., intermittently. For example, the module 126 may send a request intermittently while the vehicle 16 is being driven and receive a response from the fob 14 that the module 124 may use to authorize and/or permit continued driving of the vehicle 16. The module 126 may send information to the fob 14 regarding motion of the vehicle 16 (as a whole and/or one or more portions of the vehicle 16, e.g., of the seat 100). The module 126 may send requests to the fob 14 for responses, e.g., for a directional signal and/or an audible signal to be sent by the fob 14 to the vehicle 16. The module 126 may send one or more of these communications, or other communications, to the fob 14 through the transmitter 90 and the antenna(s) and/or transducer(s) 92.

Figure 7:
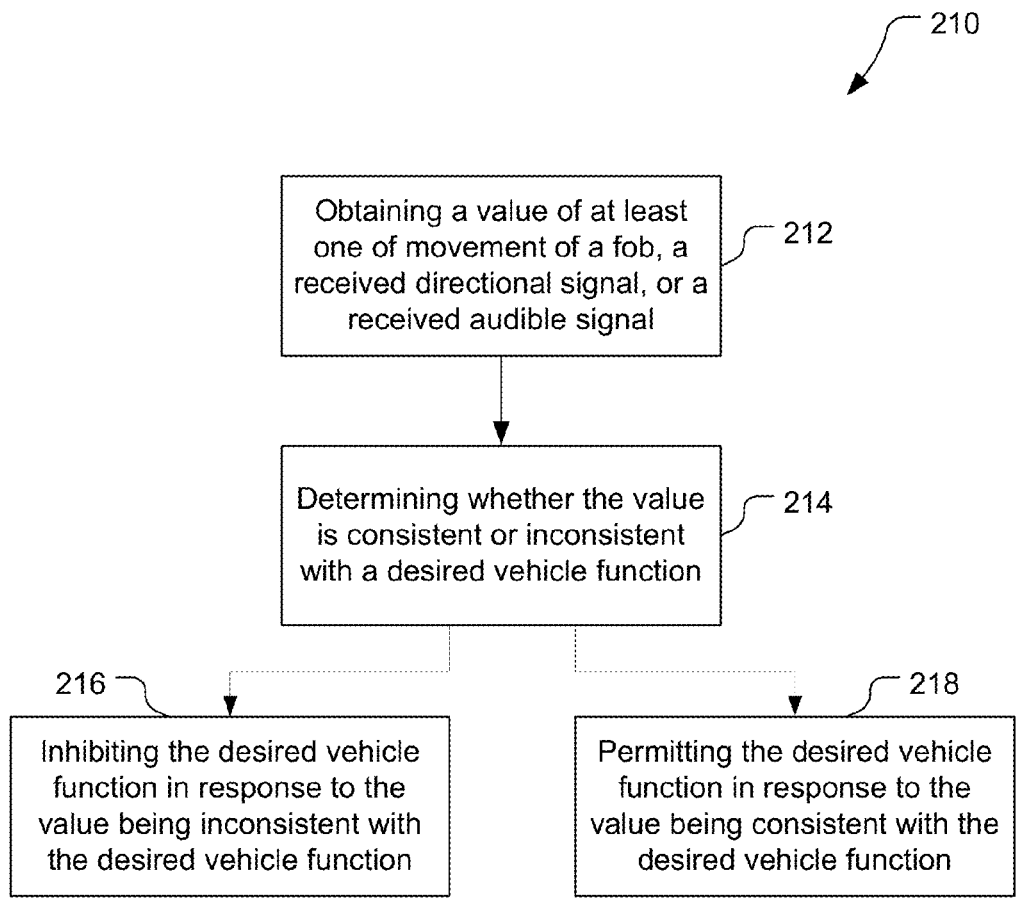
FIG. 7 is a block flow diagram of a process of operating the wireless vehicle-access system shown in FIG. 1.

Referring to FIG. 7, with further reference to FIGS. 1-6 and 8-9, a process 210 of operating a wireless vehicle-access system that includes a vehicle and a fob includes the stages shown. The process 210 is, however, an example only and not limiting. The process 210 can be altered, e.g., by having stages added, removed, rearranged, combined, performed concurrently, and/or having single stages split into multiple stages. The process 210 may be used to inhibit relay attacks on the wireless vehicle-access system and to permit desired vehicle operation in the absence of a relay attack.

At stage 212 the process 210 includes obtaining a value of at least one of movement of a fob, a received directional signal, or a received audible signal. The process 210 may include obtaining, at the vehicle-access system, a value of a vehicle-authorization parameter where the vehicle-authorization parameter comprises at least one of movement of the fob, the received directional signal, or the received audible signal. The vehicle 16 may obtain from the fob 14 raw information from which the value of the vehicle-authorization parameter may be determined (e.g., calculated) or the value itself. Alternatively, the fob 14 may obtain from the vehicle raw information from which the value of the vehicle-authorization parameter may be determined or the value itself.

Figure 8:
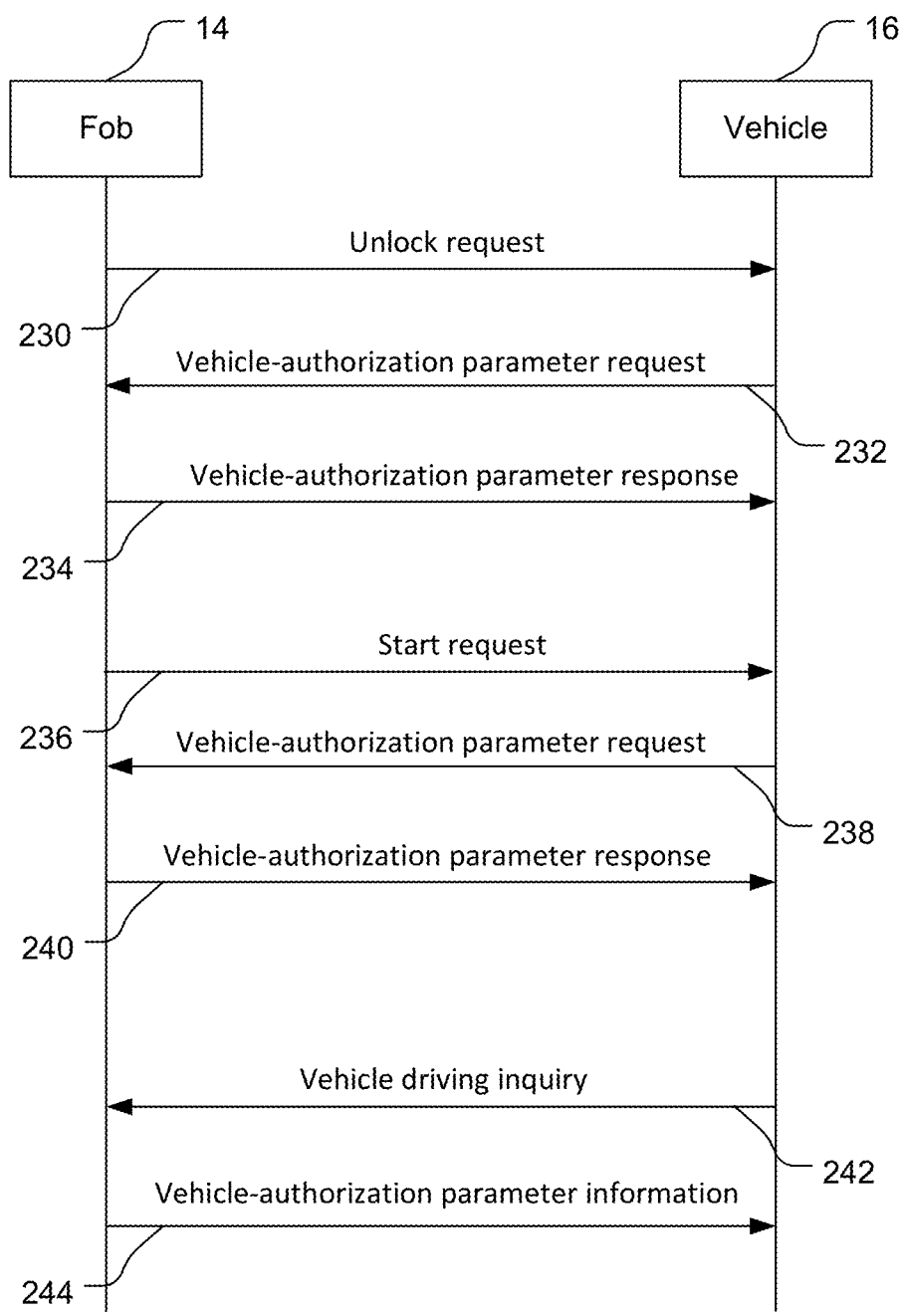
FIGS. 8-9 are example communication flow diagrams between examples of the fob and the vehicle shown in FIG. 1.

For example, FIG. 8 shows communications for an implementation where the vehicle 16 determines whether the vehicle-authorization parameter is consistent with a desired function of the vehicle 16. For unlocking the vehicle 16, the fob 14 may send an unlock request 230 to the vehicle 16. The vehicle 16 may respond to receiving the unlock request 230 by sending a vehicle-authorization parameter request 232, in response to which the fob 14 may send a vehicle-authorization parameter response 234 that may contain the raw information from which the value of the vehicle-authorization parameter (e.g., fob motion) may be determined, or the value of the vehicle-authorization parameter. The unlock request 230 and/or the response 234 may be a directional signal or an audible signal. If the unlock request 230 is a directional signal or a sound signal, the communications 232, 234 may be eliminated. For starting the vehicle, the fob 14 may send a start request 236 (or the start request may be initiated without the fob 14, e.g., by having the user 12 press a button, turn a key, etc. in the vehicle 16). The vehicle 16 may respond to receiving the start request 236 by sending a vehicle-authorization parameter request 238, in response to which the fob 14 may send a vehicle-authorization parameter response 240 that may contain the raw information from which the value of the vehicle-authorization parameter may be determined, or the value of the vehicle-authorization parameter. As with the unlock request, if the start request 236 is a directional signal or a sound signal, the communications 232, 234 may be eliminated. For driving authorization, the vehicle 16 may (e.g., intermittently such as periodically) send a vehicle driving inquiry 242 and the fob 14 may respond by sending vehicle-authorization parameter information 244 that may contain the raw information from which the value of the vehicle-authorization parameter may be determined, or the value of the vehicle-authorization parameter. If raw information is provided to the vehicle 16, then the vehicle-authorization parameter module 122 may determine the value of the vehicle-authorization parameter. The value of the vehicle-authorization parameter module 122 may be determined by the vehicle-authorization parameter module 62 in the fob 14 and provided to the vehicle 16. Alternatively, some processing of raw information may be performed in each of the fob 14 and the vehicle 16 such that the value of the vehicle-authorization parameter is partially determined in the fob 14 and partially in the vehicle 16.

Figure 9:
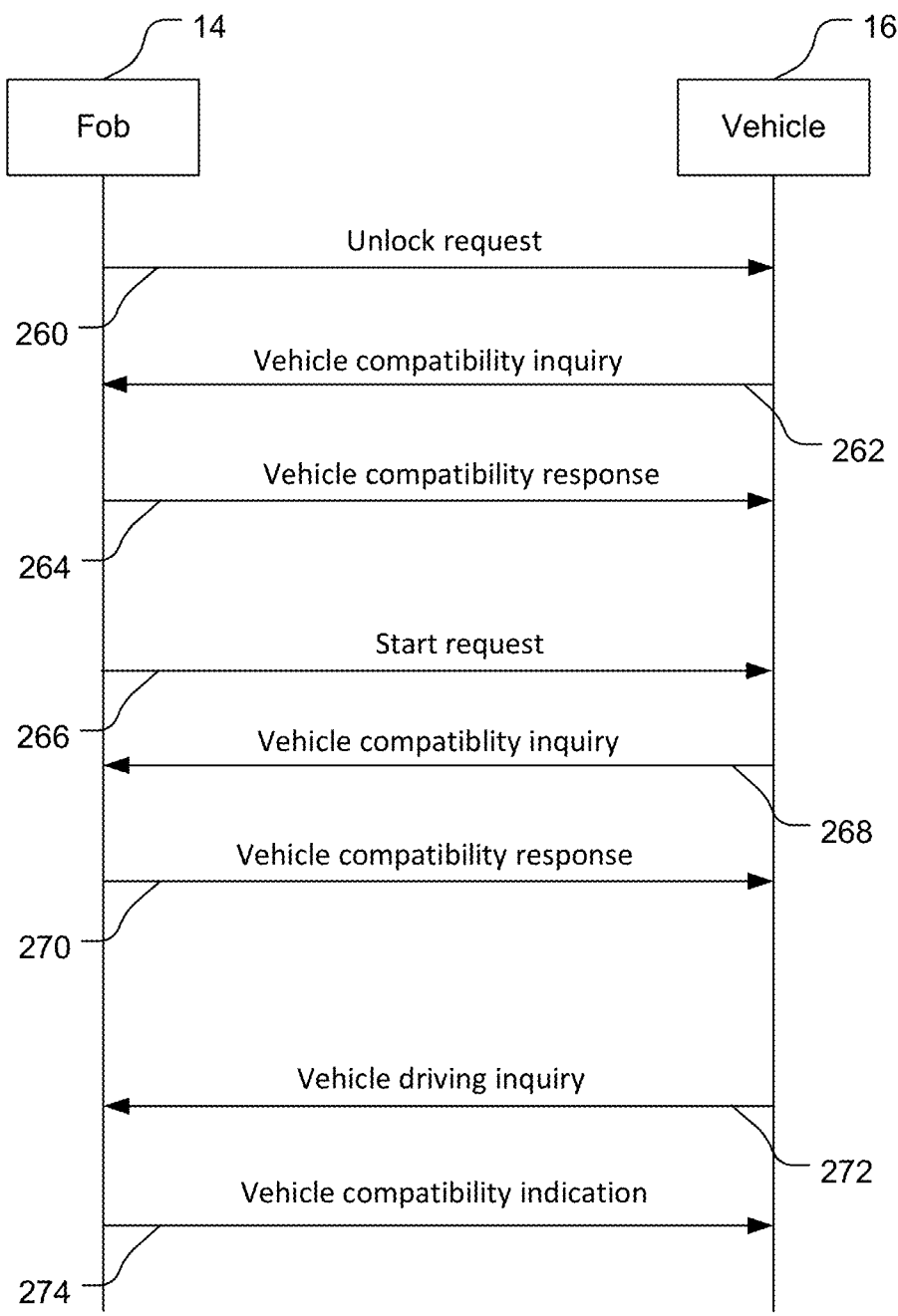

As another example, FIG. 9 shows communications for an implementation where the fob 14 determines whether the vehicle-authorization parameter is consistent with a desired function of the vehicle 16. For unlocking the vehicle 16, the fob 14 may send an unlock request 260 to the vehicle 16. The vehicle 16 may respond to receiving the unlock request 260 by sending a vehicle compatibility inquiry 262 that may be a directional signal or an audible signal and/or may contain information from which vehicle motion (e.g., total vehicle motion, vehicle seat motion, etc.) may be determined, and/or one or more indications of vehicle motion (i.e., processed raw information). The inquiry 262 also inquires as to the compatibility of the fob 14 with starting the vehicle 16. For starting the vehicle 16, the fob 14 may send a start request 266 (or the start request may be initiated without the fob 14, e.g., by having the user 12 press a button, turn a key, etc. in the vehicle 16). The vehicle 16 may respond to receiving the start request 266 by sending a vehicle compatibility inquiry 268, e.g., similar to the inquiry 262, but inquiring as to compatibility of the fob 14 with starting the vehicle 16. For driving authorization, the vehicle 16 may send (e.g., intermittently such as periodically) a vehicle driving inquiry 272, e.g., similar to the inquiry 262, but inquiring as to compatibility of the fob 14 with driving the vehicle 16.

Returning to FIG. 7, at stage 214, the process 210 includes determining whether the value is consistent or inconsistent with a desired vehicle function. The process 210 may include determining, at the vehicle-access system, whether the value of the vehicle-authorization parameter is consistent or inconsistent (i.e., not consistent) with a desired function of the vehicle 16. The determining may be analyzing information regarding consistency of the vehicle-authorization parameter value with the desired function, or may be receiving a conclusion or indication of the consistency or inconsistency of the vehicle-authorization parameter value with the desired function. For example, referring to FIG. 8, the vehicle 16 (e.g., the vehicle function compatibility module 124) determines, e.g., using information provided by the fob 14 in the response 234 or the response 240 or the information 244, whether the value of the vehicle-authorization parameter is consistent or inconsistent with a desired function of the vehicle 16. As another example, referring to FIG. 9, the fob 14 (e.g., the vehicle function compatibility module 64) determines, e.g., using information measured by the fob 14 and/or provided in the inquiry 262 or the inquiry 268 or the inquiry 272, whether the value of the vehicle-authorization parameter is consistent or inconsistent with a desired function of the vehicle 16. Examples of criteria for determining, by the fob 14 or the vehicle 16, whether the value of the vehicle-authorization parameter is consistent or inconsistent with a desired function of the vehicle 16 are provided above.

At stage 216, the process 210 includes inhibiting the desired vehicle function in response to the value of the vehicle-authorization parameter being inconsistent with the desired function of the vehicle. For example, the vehicle 16 may inhibit the desired function by not unlocking the vehicle 16, not starting an engine of the vehicle 16, or disabling operation of the engine of the vehicle 16. As further examples, the fob 14 may inhibit the desired function by not sending a vehicle compatibility response 264, 270 or a vehicle compatibility indication 274 where these communications are needed by the vehicle 16 to unlock the vehicle 16, to start an engine of the vehicle 16, or to (continue to) enable driving of the vehicle 16, respectively. Alternatively, the fob 14 may inhibit the desired function by including in the vehicle compatibility response 264, 270 or the vehicle compatibility indication 274 an indication to inhibit the desired function, or an indication of incompatibility of the value of the vehicle-authorization parameter and the desired function (i.e., that the value of the vehicle-authorization parameter is inconsistent with the desired function).

At stage 218, the process 210 includes permitting the desired vehicle function in response to the value of the vehicle-authorization parameter being consistent with the desired function of the vehicle. For example, the vehicle 16 may permit the desired function by unlocking (or at least not preventing unlocking of) the vehicle 16, starting an engine of the vehicle 16, or continuing to enable operation of the engine of the vehicle 16. As further examples, the fob 14 may permit the desired function by sending the vehicle compatibility response 264, 270 or the vehicle compatibility indication 274 where these communications are needed by the vehicle 16 to unlock the vehicle 16, to start an engine of the vehicle 16, or to (continue to) enable driving of the vehicle 16, respectively. Alternatively, the fob 14 may permit the desired function by including in the vehicle compatibility response 264, 270 or the vehicle compatibility indication 274 an indication to permit the desired function, or an indication of compatibility of the value of the vehicle-authorization parameter and the desired function (i.e., that the value of the vehicle-authorization parameter is consistent with the desired function).

Other Considerations

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

A statement that information is sent to or toward a destination does not require specific directionality of a transmission (e.g., does not require a wireless transmission to be sent from a source of the transmission in the direction of the destination). Further, such a statement does not require completion of a transmission of the information. The complete transmission may be through one or more intermediate nodes and may, at one or more of the intermediate nodes, be sent in a direction at least partially away from the destination.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. An apparatus in a wireless vehicle-access system that includes a vehicle and a fob, the apparatus comprising:
   a memory; and
   a processor communicatively coupled to the memory and configured to:

obtain a value of a vehicle-authorization parameter wherein the vehicle-authorization parameter comprises movement of the fob;

determine whether the value of the vehicle-authorization parameter is consistent or inconsistent with a desired function of the vehicle;

inhibit the desired function of the vehicle in response to the value of the vehicle-authorization parameter being determined to be inconsistent with the desired function of the vehicle; and permit the desired function of the vehicle in response to the value of the vehicle-authorization parameter being determined to be consistent with the desired function of the vehicle;

wherein the desired function of the vehicle is vehicle starting; and wherein:
the processor is configured to determine that the movement of the fob is consistent with the desired function if the movement of the fob is a fob speed being below a vehicle-starting threshold;

the processor is configured to determine that the movement of the fob is consistent with the desired function if the movement of the fob is spatial fob motion being consistent with movement of a seat of the vehicle, the spatial fob motion comprising a direction or a magnitude of fob motion, or a combination thereof; or the processor is configured to determine that the movement of the fob is consistent with the desired function if the movement of the fob is the spatial fob motion being consistent with a user of the fob sitting in the vehicle; or a combination of two or more of these.

2. The apparatus of claim 1, wherein the spatial fob motion being consistent with movement of the seat of the vehicle comprises the spatial fob motion differing from concurrent movement of at least a portion of the seat by less than a fob/seat-movement-differential threshold.

3. An apparatus in a wireless vehicle-access system that includes a vehicle and a fob, the apparatus comprising:
a memory; and
a processor communicatively coupled to the memory and configured to:
obtain a value of a vehicle-authorization parameter wherein the vehicle-authorization parameter comprises movement of the fob;
determine whether the value of the vehicle-authorization parameter is consistent or inconsistent with a desired function of the vehicle;
inhibit the desired function of the vehicle in response to the value of the vehicle-authorization parameter being determined to be inconsistent with the desired function of the vehicle; and
permit the desired function of the vehicle in response to the value of the vehicle-authorization parameter being determined to be consistent with the desired function of the vehicle;
wherein the desired function of the vehicle is vehicle starting, and wherein the processor is configured to determine that the movement of the fob is inconsistent with the desired function if the movement of the fob is spatial cyclic up and down fob motion indicative of pedestrian motion.

4. An apparatus in a wireless vehicle-access system that includes a vehicle and a fob, the apparatus comprising:
a memory; and
a processor communicatively coupled to the memory and configured to:
obtain a value of a vehicle-authorization parameter wherein the vehicle-authorization parameter comprises movement of the fob;
determine whether the value of the vehicle-authorization parameter is consistent or inconsistent with a desired function of the vehicle;
inhibit the desired function of the vehicle in response to the value of the vehicle-authorization parameter being determined to be inconsistent with the desired function of the vehicle; and
permit the desired function of the vehicle in response to the value of the vehicle-authorization parameter being determined to be consistent with the desired function of the vehicle;
wherein the desired function of the vehicle is vehicle driving, and wherein:
the processor is configured to determine that the movement of the fob is consistent with the desired function if the movement of the fob is spatial fob motion being consistent with a user of the fob sitting in the vehicle, the spatial fob motion comprising a direction or a magnitude of fob motion, or a combination thereof;
the processor is configured to determine that the movement of the fob is consistent with the desired function if the movement of the fob is a fob speed differing by less than a speed-differential threshold relative to a speed of the vehicle; or
the processor is configured to determine that the movement of the fob is consistent with the desired function if the movement of the fob is the spatial fob motion being consistent with movement of a seat of the vehicle; or
a combination of two or more of these.

5. The apparatus of claim 4, wherein the spatial fob motion being consistent with movement of the seat of the vehicle comprises the spatial fob motion differing from concurrent movement of at least a portion of the seat by less than a fob/seat-movement-differential threshold.

6. An apparatus in a wireless vehicle-access system that includes a vehicle and a fob, the apparatus comprising:
a memory; and
a processor communicatively coupled to the memory and configured to:
obtain a value of a vehicle-authorization parameter wherein the vehicle-authorization parameter comprises movement of the fob;
determine whether the value of the vehicle-authorization parameter is consistent or inconsistent with a desired function of the vehicle;
inhibit the desired function of the vehicle in response to the value of the vehicle-authorization parameter being determined to be inconsistent with the desired function of the vehicle; and
permit the desired function of the vehicle in response to the value of the vehicle-authorization parameter being determined to be consistent with the desired function of the vehicle;
wherein the desired function of the vehicle is vehicle driving, and wherein the processor is configured to determine that the movement of the fob is inconsistent with the desired function if the movement of the fob is spatial cyclic up and down fob motion indicative of pedestrian motion.

7. An apparatus in a wireless vehicle-access system that includes a vehicle and a fob, the apparatus comprising:
a memory; and
a processor communicatively coupled to the memory and configured to:
obtain a value of a vehicle-authorization parameter wherein the vehicle-authorization parameter comprises a received directional signal;
determine whether the value of the vehicle-authorization parameter is consistent or inconsistent with a desired function of the vehicle;
inhibit the desired function of the vehicle in response to the value of the vehicle-authorization parameter being determined to be inconsistent with the desired function of the vehicle; and
permit the desired function of the vehicle in response to the value of the vehicle-authorization parameter being determined to be consistent with the desired function of the vehicle;
wherein the processor is configured to determine that the value of the vehicle-authorization parameter is consistent with the desired function if the value of the vehicle-authorization parameter exceeds a non-zero directional-signal-intensity threshold.

8. An apparatus in a wireless vehicle-access system that includes a vehicle and a fob, the apparatus comprising:
a memory; and
a processor communicatively coupled to the memory and configured to:
obtain a value of a vehicle-authorization parameter wherein the vehicle-authorization parameter comprises a received directional signal;
determine whether the value of the vehicle-authorization parameter is consistent or inconsistent with a desired function of the vehicle;
inhibit the desired function of the vehicle in response to the value of the vehicle-authorization parameter being determined to be inconsistent with the desired function of the vehicle; and
permit the desired function of the vehicle in response to the value of the vehicle-authorization parameter being determined to be consistent with the desired function of the vehicle;
wherein the processor is configured to determine that the value of the vehicle-authorization parameter is consistent with the desired function if the value of the vehicle-authorization parameter is non-zero; and
wherein the processor is configured to obtain the directional signal from the vehicle via a receiver of the fob.

9. An apparatus in a wireless vehicle-access system that includes a vehicle and a fob, the apparatus comprising:
a memory; and
a processor communicatively coupled to the memory and configured to:
obtain a value of a vehicle-authorization parameter wherein the vehicle-authorization parameter comprises a received audible signal;
determine whether the value of the vehicle-authorization parameter is consistent or inconsistent with a desired function of the vehicle;
inhibit the desired function of the vehicle in response to the value of the vehicle-authorization parameter being determined to be inconsistent with the desired function of the vehicle; and
permit the desired function of the vehicle in response to the value of the vehicle-authorization parameter being determined to be consistent with the desired function of the vehicle;
wherein the processor is configured to determine that the value of the vehicle-authorization parameter is consistent with the desired function if the value of the vehicle-authorization parameter is non-zero.

10. The apparatus of claim 9, wherein the processor is configured to determine that the value of the vehicle-authorization parameter is consistent with the desired function if the value of the vehicle-authorization parameter exceeds a non-zero audible-signal-intensity threshold.

11. A method for a wireless vehicle-access system that includes a vehicle and a fob, the method comprising:
obtaining, at the vehicle-access system, a value of a vehicle-authorization parameter wherein the vehicle-authorization parameter comprises movement of the fob;
determining, at the vehicle-access system, whether the value of the vehicle-authorization parameter is consistent or inconsistent with a desired function of the vehicle; and
either:
inhibiting the desired function of the vehicle in response to the value of the vehicle-authorization parameter being inconsistent with the desired function; or
permitting the desired function of the vehicle in response to the value of the vehicle-authorization parameter being consistent with the desired function;
wherein the desired function of the vehicle is vehicle starting; and
wherein the movement of the fob is determined to be consistent with the desired function if the movement of the fob is:
a fob speed that is below a vehicle-starting threshold;
spatial fob motion being consistent with movement of a seat of the vehicle, the spatial fob motion comprising a direction or a magnitude of fob motion, or a combination thereof; or
consistent with a user of the fob sitting in the vehicle; or
a combination of two or more of these.

12. The method of claim 11, wherein the spatial fob motion being consistent with movement of the seat of the vehicle comprises the spatial fob motion differing from concurrent movement of at least a portion of the seat by less than a fob/seat-movement-differential threshold.

13. A method for a wireless vehicle-access system that includes a vehicle and a fob, the method comprising:
obtaining, at the vehicle-access system, a value of a vehicle-authorization parameter wherein the vehicle-authorization parameter comprises movement of the fob;
determining, at the vehicle-access system, whether the value of the vehicle-authorization parameter is consistent or inconsistent with a desired function of the vehicle; and
either:
inhibiting the desired function of the vehicle in response to the value of the vehicle-authorization parameter being inconsistent with the desired function; or
permitting the desired function of the vehicle in response to the value of the vehicle-authorization parameter being consistent with the desired function;

wherein the desired function of the vehicle is vehicle starting, and wherein the movement of the fob is determined to be inconsistent with the desired function if the movement of the fob is spatial cyclic up and down fob motion indicative of pedestrian motion.

14. A method for a wireless vehicle-access system that includes a vehicle and a fob, the method comprising:
   obtaining, at the vehicle-access system, a value of a vehicle-authorization parameter wherein the vehicle-authorization parameter comprises movement of the fob;
   determining, at the vehicle-access system, whether the value of the vehicle-authorization parameter is consistent or inconsistent with a desired function of the vehicle; and
   either:
      inhibiting the desired function of the vehicle in response to the value of the vehicle-authorization parameter being inconsistent with the desired function; or
      permitting the desired function of the vehicle in response to the value of the vehicle-authorization parameter being consistent with the desired function;
   wherein the desired function of the vehicle is vehicle driving, and wherein the movement of the fob is determined to be consistent with the desired function if the movement of the fob is:
      spatial fob motion being consistent with a user of the fob sitting in the vehicle, the spatial fob motion comprising a direction or a magnitude of fob motion, or a combination thereof;
      a fob speed differing by less than a speed-differential threshold relative to a speed of the vehicle; or
      the spatial fob motion being consistent with movement of a seat of the vehicle; or
      a combination of two or more of these.

15. The method of claim 14, wherein the spatial fob motion being consistent with movement of the seat of the vehicle comprises the spatial fob motion differing from concurrent movement of at least a portion of the seat by less than a fob/seat-movement-differential threshold.

16. A method for a wireless vehicle-access system that includes a vehicle and a fob, the method comprising:
   obtaining, at the vehicle-access system, a value of a vehicle-authorization parameter wherein the vehicle-authorization parameter comprises movement of the fob;
   determining, at the vehicle-access system, whether the value of the vehicle-authorization parameter is consistent or inconsistent with a desired function of the vehicle; and
   either:
      inhibiting the desired function of the vehicle in response to the value of the vehicle-authorization parameter being inconsistent with the desired function; or
      permitting the desired function of the vehicle in response to the value of the vehicle-authorization parameter being consistent with the desired function;
   wherein the desired function of the vehicle is vehicle driving, and wherein the movement of the fob is determined to be inconsistent with the desired function if the movement of the fob is spatial cyclic up and down fob motion indicative of pedestrian motion.

17. A method for a wireless vehicle-access system that includes a vehicle and a fob, the method comprising:
   obtaining, at the vehicle-access system, a value of a vehicle-authorization parameter wherein the vehicle-authorization parameter comprises a received directional signal;
   determining, at the vehicle-access system, whether the value of the vehicle-authorization parameter is consistent or inconsistent with a desired function of the vehicle; and
   either:
      inhibiting the desired function of the vehicle in response to the value of the vehicle-authorization parameter being inconsistent with the desired function; or
      permitting the desired function of the vehicle in response to the value of the vehicle-authorization parameter being consistent with the desired function;
   wherein the value of the vehicle-authorization parameter is determined to be consistent with the desired function if the value of the vehicle-authorization parameter exceeds a non-zero directional-signal-intensity threshold.

18. A method for a wireless vehicle-access system that includes a vehicle and a fob, the method comprising:
   obtaining, at the vehicle-access system, a value of a vehicle-authorization parameter wherein the vehicle-authorization parameter comprises a received directional signal;
   determining, at the vehicle-access system, whether the value of the vehicle-authorization parameter is consistent or inconsistent with a desired function of the vehicle; and
   either:
      inhibiting the desired function of the vehicle in response to the value of the vehicle-authorization parameter being inconsistent with the desired function; or
      permitting the desired function of the vehicle in response to the value of the vehicle-authorization parameter being consistent with the desired function;
   wherein the directional signal is received by the fob from the vehicle.

19. A method for a wireless vehicle-access system that includes a vehicle and a fob, the method comprising:
   obtaining, at the vehicle-access system, a value of a vehicle-authorization parameter wherein the vehicle-authorization parameter comprises a received audible signal;
   determining, at the vehicle-access system, whether the value of the vehicle-authorization parameter is consistent or inconsistent with a desired function of the vehicle; and
   either:
      inhibiting the desired function of the vehicle in response to the value of the vehicle-authorization parameter being inconsistent with the desired function; or
      permitting the desired function of the vehicle in response to the value of the vehicle-authorization parameter being consistent with the desired function;
   wherein the value of the vehicle-authorization parameter is determined to be consistent with the desired function if the value of the vehicle-authorization parameter is non-zero.

20. The method of claim 19, wherein the value of the vehicle-authorization parameter is determined to be consistent with the desired function if the value of the vehicle-authorization parameter exceeds a non-zero audible-signal-intensity threshold.

21. An apparatus in a wireless vehicle-access system that includes a vehicle and a fob, the apparatus comprising:
    means for obtaining a value of a vehicle-authorization parameter wherein the vehicle-authorization parameter comprises movement of the fob; and
    vehicle function compatibility means comprising:
        means for determining whether the value of the vehicle-authorization parameter is consistent or inconsistent with a desired function of the vehicle;
        means for inhibiting the desired function of the vehicle in response to the value of the vehicle-authorization parameter being determined to be inconsistent with the desired function; and
        means for permitting the desired function of the vehicle in response to the value of the vehicle-authorization parameter being determined to be consistent with the desired function;
    wherein the desired function of the vehicle is vehicle starting; and
    wherein:
        the means for determining are for determining that the movement of the fob is consistent with the desired function of the vehicle if the movement of the fob is a fob speed being below a vehicle-starting threshold;
        the means for determining are for determining that the movement of the fob is consistent with the desired function of the vehicle if the movement of the fob is spatial fob motion being consistent with movement of a seat of the vehicle, the spatial fob motion comprising a direction or a magnitude of fob motion, or a combination thereof; or
        the means for determining are for determining that the movement of the fob is consistent with the desired function of the vehicle if the movement of the fob is the spatial fob motion being consistent with a user of the fob sitting in the vehicle; or
        a combination of two or more of these.

22. The apparatus of claim 21, wherein the spatial fob motion being consistent with movement of the seat of the vehicle comprises the spatial fob motion differing from concurrent movement of at least a portion of the seat by less than a fob/seat-movement-differential threshold.

23. An apparatus in a wireless vehicle-access system that includes a vehicle and a fob, the apparatus comprising:
    means for obtaining a value of a vehicle-authorization parameter wherein the vehicle-authorization parameter comprises movement of the fob; and
    vehicle function compatibility means comprising:
        means for determining whether the value of the vehicle-authorization parameter is consistent or inconsistent with a desired function of the vehicle;
        means for inhibiting the desired function of the vehicle in response to the value of the vehicle-authorization parameter being determined to be inconsistent with the desired function; and
        means for permitting the desired function of the vehicle in response to the value of the vehicle-authorization parameter being determined to be consistent with the desired function;
    wherein the desired function of the vehicle is vehicle starting, and wherein the vehicle function compatibility means are for determining that the movement of the fob is inconsistent with the desired function if the movement of the fob is spatial cyclic up and down fob motion indicative of pedestrian motion.

24. An apparatus in a wireless vehicle-access system that includes a vehicle and a fob, the apparatus comprising:
    means for obtaining a value of a vehicle-authorization parameter wherein the vehicle-authorization parameter comprises movement of the fob; and
    vehicle function compatibility means comprising:
        means for determining whether the value of the vehicle-authorization parameter is consistent or inconsistent with a desired function of the vehicle;
        means for inhibiting the desired function of the vehicle in response to the value of the vehicle-authorization parameter being determined to be inconsistent with the desired function; and
        means for permitting the desired function of the vehicle in response to the value of the vehicle-authorization parameter being determined to be consistent with the desired function;
    wherein the desired function of the vehicle is vehicle driving, and wherein:
        the vehicle function compatibility means are for determining that the movement of the fob is consistent with the desired function if the movement of the fob is spatial fob motion being consistent with a user of the fob sitting in the vehicle, the spatial fob motion comprising a direction or a magnitude of fob motion, or a combination thereof;
        the vehicle function compatibility means are for determining that the movement of the fob is consistent with the desired function if the movement of the fob is a fob speed differing by less than a speed-differential threshold relative to a speed of the vehicle; or
        the vehicle function compatibility means are for determining that the movement of the fob is consistent with the desired function if the movement of the fob is the spatial fob motion being consistent with movement of a seat of the vehicle; or
        a combination of two or more of these.

25. The apparatus of claim 24, wherein the spatial fob motion being consistent with movement of the seat of the vehicle comprises the spatial fob motion differing from concurrent movement of at least a portion of the seat by less than a fob/seat-movement-differential threshold.

26. An apparatus in a wireless vehicle-access system that includes a vehicle and a fob, the apparatus comprising:
    means for obtaining a value of a vehicle-authorization parameter wherein the vehicle-authorization parameter comprises movement of the fob; and
    vehicle function compatibility means comprising:
        means for determining whether the value of the vehicle-authorization parameter is consistent or inconsistent with a desired function of the vehicle;
        means for inhibiting the desired function of the vehicle in response to the value of the vehicle-authorization parameter being determined to be inconsistent with the desired function; and
        means for permitting the desired function of the vehicle in response to the value of the vehicle-authorization parameter being determined to be consistent with the desired function;
    wherein the desired function of the vehicle is vehicle driving, and wherein the vehicle function compatibility means are for determining that the movement of the fob is inconsistent with the desired function if the movement of the fob is spatial cyclic up and down fob motion indicative of pedestrian motion.

27. An apparatus in a wireless vehicle-access system that includes a vehicle and a fob, the apparatus comprising:
- means for obtaining a value of a vehicle-authorization parameter wherein the vehicle-authorization parameter comprises a received directional signal; and
- vehicle function compatibility means comprising:
  - means for determining whether the value of the vehicle-authorization parameter is consistent or inconsistent with a desired function of the vehicle;
  - means for inhibiting the desired function of the vehicle in response to the value of the vehicle-authorization parameter being determined to be inconsistent with the desired function; and
  - means for permitting the desired function of the vehicle in response to the value of the vehicle-authorization parameter being determined to be consistent with the desired function;
- wherein the vehicle function compatibility means are for determining that the value of the vehicle-authorization parameter is consistent with the desired function if the value of the vehicle-authorization parameter exceeds a non-zero directional-signal-intensity threshold.

28. An apparatus in a wireless vehicle-access system that includes a vehicle and a fob, the apparatus comprising:
- means for obtaining a value of a vehicle-authorization parameter wherein the vehicle-authorization parameter comprises a received audible signal; and
- vehicle function compatibility means comprising:
  - means for determining whether the value of the vehicle-authorization parameter is consistent or inconsistent with a desired function of the vehicle;
  - means for inhibiting the desired function of the vehicle in response to the value of the vehicle-authorization parameter being determined to be inconsistent with the desired function; and
  - means for permitting the desired function of the vehicle in response to the value of the vehicle-authorization parameter being determined to be consistent with the desired function;
- wherein the vehicle function compatibility means are for determining that the value of the vehicle-authorization parameter is consistent with the desired function if the value of the vehicle-authorization parameter is non-zero.

29. The apparatus of claim 28, wherein the vehicle function compatibility means are for determining that the value of the vehicle-authorization parameter is consistent with the desired function if the value of the vehicle-authorization parameter exceeds a non-zero audible-signal-intensity threshold.

30. A non-transitory processor-readable storage medium in a wireless vehicle-access system that includes a vehicle and a fob, the processor-readable storage medium comprising processor-readable instructions configured to cause a processor to:
- obtain a value of a vehicle-authorization parameter wherein the vehicle-authorization parameter comprises movement of the fob;
- determine whether the value of the vehicle-authorization parameter is consistent or inconsistent with a desired function of the vehicle;
- inhibit the desired function of the vehicle in response to the value of the vehicle-authorization parameter being determined to be inconsistent with the desired function; and
- permit the desired function of the vehicle in response to the value of the vehicle-authorization parameter being determined to be consistent with the desired function;
- wherein the desired function of the vehicle is vehicle starting; and
- wherein:
  - the instructions configured to cause the processor to determine are configured to cause the processor to determine that the movement of the fob is consistent with the desired function of the vehicle if the movement of the fob is a fob speed being below a vehicle-starting threshold;
  - the instructions configured to cause the processor to determine are configured to cause the processor to determine that the movement of the fob is consistent with the desired function of the vehicle if the movement of the fob is spatial fob motion being consistent with movement of a seat of the vehicle, the spatial fob motion comprising a direction or a magnitude of fob motion, or a combination thereof; or
  - the instructions configured to cause the processor to determine are configured to cause the processor to determine that the movement of the fob is consistent with the desired function of the vehicle if the movement of the fob is the spatial fob motion being consistent with a user of the fob sitting in the vehicle; or
  - a combination thereof.

31. The processor-readable storage medium of claim 30, wherein the spatial fob motion being consistent with movement of the seat of the vehicle comprises the spatial fob motion differing from concurrent movement of at least a portion of the seat by less than a fob/seat-movement-differential threshold.

32. A non-transitory processor-readable storage medium in a wireless vehicle-access system that includes a vehicle and a fob, the processor-readable storage medium comprising processor-readable instructions configured to cause a processor to:
- obtain a value of a vehicle-authorization parameter wherein the vehicle-authorization parameter comprises movement of the fob;
- determine whether the value of the vehicle-authorization parameter is consistent or inconsistent with a desired function of the vehicle;
- inhibit the desired function of the vehicle in response to the value of the vehicle-authorization parameter being determined to be inconsistent with the desired function; and
- permit the desired function of the vehicle in response to the value of the vehicle-authorization parameter being determined to be consistent with the desired function;
- wherein the desired function of the vehicle is vehicle starting, and wherein the instructions configured to cause the processor to determine are configured to cause the processor to determine that the movement of the fob is inconsistent with the desired function if the movement of the fob is spatial cyclic up and down fob motion indicative of pedestrian motion.

33. A non-transitory processor-readable storage medium in a wireless vehicle-access system that includes a vehicle and a fob, the processor-readable storage medium comprising processor-readable instructions configured to cause a processor to:
- obtain a value of a vehicle-authorization parameter wherein the vehicle-authorization parameter comprises movement of the fob;

determine whether the value of the vehicle-authorization parameter is consistent or inconsistent with a desired function of the vehicle;
inhibit the desired function of the vehicle in response to the value of the vehicle-authorization parameter being determined to be inconsistent with the desired function; and
permit the desired function of the vehicle in response to the value of the vehicle-authorization parameter being determined to be consistent with the desired function;
wherein the desired function of the vehicle is vehicle driving, and wherein:
  the instructions configured to cause the processor to determine are configured to cause the processor to determine that the movement of the fob is consistent with the desired function if the movement of the fob is spatial fob motion being consistent with a user of the fob sitting in the vehicle, the spatial fob motion comprising a direction or a magnitude of fob motion, or a combination thereof;
  the instructions configured to cause the processor to determine are configured to cause the processor to determine that the movement of the fob is consistent with the desired function if the movement of the fob is a fob speed differing by less than a speed-differential threshold relative to a speed of the vehicle; or
  the instructions configured to cause the processor to determine are configured to cause the processor to determine that the movement of the fob is consistent with the desired function if the movement of the fob is the spatial fob motion being consistent with movement of a seat of the vehicle; or
  a combination of two or more of these.

34. The processor-readable storage medium of claim 33, wherein the spatial fob motion being consistent with movement of the seat of the vehicle comprises the spatial fob motion differing from concurrent movement of at least a portion of the seat by less than a fob/seat-movement-differential threshold.

35. A non-transitory processor-readable storage medium in a wireless vehicle-access system that includes a vehicle and a fob, the processor-readable storage medium comprising processor-readable instructions configured to cause a processor to:
  obtain a value of a vehicle-authorization parameter wherein the vehicle-authorization parameter comprises movement of the fob;
  determine whether the value of the vehicle-authorization parameter is consistent or inconsistent with a desired function of the vehicle;
  inhibit the desired function of the vehicle in response to the value of the vehicle-authorization parameter being determined to be inconsistent with the desired function; and
  permit the desired function of the vehicle in response to the value of the vehicle-authorization parameter being determined to be consistent with the desired function;
  wherein the desired function of the vehicle is vehicle driving, and wherein the instructions configured to cause the processor to determine are configured to cause the processor to determine that the movement of the fob is inconsistent with the desired function if the movement of the fob is spatial cyclic up and down fob motion indicative of pedestrian motion.

36. A non-transitory processor-readable storage medium in a wireless vehicle-access system that includes a vehicle and a fob, the processor-readable storage medium comprising processor-readable instructions configured to cause a processor to:
  obtain a value of a vehicle-authorization parameter wherein the vehicle-authorization parameter comprises a received directional signal;
  determine whether the value of the vehicle-authorization parameter is consistent or inconsistent with a desired function of the vehicle;
  inhibit the desired function of the vehicle in response to the value of the vehicle-authorization parameter being determined to be inconsistent with the desired function; and
  permit the desired function of the vehicle in response to the value of the vehicle-authorization parameter being determined to be consistent with the desired function;
  wherein the instructions configured to cause the processor to determine are configured to cause the processor to determine that the value of the vehicle-authorization parameter is consistent with the desired function if the value of the vehicle-authorization parameter exceeds a non-zero directional-signal-intensity threshold.

37. A non-transitory processor-readable storage medium in a wireless vehicle-access system that includes a vehicle and a fob, the processor-readable storage medium comprising processor-readable instructions configured to cause a processor to:
  obtain a value of a vehicle-authorization parameter wherein the vehicle-authorization parameter comprises a received audible signal;
  determine whether the value of the vehicle-authorization parameter is consistent or inconsistent with a desired function of the vehicle;
  inhibit the desired function of the vehicle in response to the value of the vehicle-authorization parameter being determined to be inconsistent with the desired function; and
  permit the desired function of the vehicle in response to the value of the vehicle-authorization parameter being determined to be consistent with the desired function;
  wherein the instructions configured to cause the processor to determine are configured to cause the processor to determine that the value of the vehicle-authorization parameter is consistent with the desired function if the value of the vehicle-authorization parameter is non-zero.

38. The processor-readable storage medium of claim 37, wherein the instructions configured to cause the processor to determine are configured to cause the processor to determine that the value of the vehicle-authorization parameter is consistent with the desired function if the value of the vehicle-authorization parameter exceeds a non-zero audible-signal-intensity threshold.

39. An apparatus in a wireless vehicle-access system that includes a vehicle and a fob, the apparatus comprising:
  a memory; and
  a processor communicatively coupled to the memory and configured to:
    determine movement of the fob;
    determine vehicle movement, of at least a portion of the vehicle, that is concurrent with the movement of the fob; and
    determine whether the movement of the fob and the vehicle movement are consistent or inconsistent with each other;

inhibit a desired function of the vehicle in response to the movement of the fob and the vehicle movement being inconsistent with each other; and permit the desired function of the vehicle in response to the movement of the fob and the vehicle movement being consistent with each other.

40. The apparatus of claim 39, wherein the movement of the fob comprises a direction or a magnitude of fob motion, or a combination thereof, and wherein the vehicle movement comprises a direction or a magnitude of motion of the at least a portion of the vehicle, or a combination thereof.

41. The apparatus of claim 40, wherein the processor is configured to determine that the movement of the fob and the vehicle movement are consistent with each other if the movement of the fob differs from the vehicle movement by less than a fob/vehicle-movement-differential threshold.

42. The apparatus of claim 40, wherein the at least a portion of the vehicle comprises at least a portion of a seat of the vehicle.

43. The apparatus of claim 42, wherein the at least a portion of the seat of the vehicle comprises a cover of the seat of the vehicle and wherein the processor is configured to determine that the movement of the fob and the vehicle movement are consistent with each other if the magnitude and direction of the movement of the fob differ from the magnitude and direction of the vehicle movement by less than a fob/seat-movement-differential threshold.

44. The apparatus of claim 42, wherein the desired function of the vehicle comprises unlocking the vehicle or driving the vehicle, or a combination thereof.

* * * * *